(12) United States Patent
Jakobson et al.

(10) Patent No.: US 9,135,228 B2
(45) Date of Patent: Sep. 15, 2015

(54) PRESENTATION OF DOCUMENT HISTORY IN A WEB BROWSING APPLICATION

(75) Inventors: Gabriel Jakobson, Las Vegas, NV (US); Steven Reuben, Las Vegas, NV (US)

(73) Assignee: Domo, Inc., American Fork, UT (US)

( * ) Notice: Subject to any disclaimer, the term of this patent is extended or adjusted under 35 U.S.C. 154(b) by 495 days.

(21) Appl. No.: 13/506,727

(22) Filed: May 11, 2012

(65) Prior Publication Data

US 2012/0233137 A1  Sep. 13, 2012

(51) Int. Cl.
| | |
|---|---|
| *G06F 17/30* | (2006.01) |
| *G06F 7/00* | (2006.01) |
| *G06F 17/22* | (2006.01) |
| *G06F 3/0484* | (2013.01) |
| *G06T 13/80* | (2011.01) |
| *G06T 11/60* | (2006.01) |

(52) U.S. Cl.
CPC ........ *G06F 17/2288* (2013.01); *G06F 3/04847* (2013.01); *G06T 11/60* (2013.01); *G06T 13/80* (2013.01)

(58) Field of Classification Search
CPC .......... G06F 17/3002; G06F 17/30017; G06F 17/30029
See application file for complete search history.

(56) References Cited

U.S. PATENT DOCUMENTS

| | | | | |
|---|---|---|---|---|
| 5,353,391 | A * | 10/1994 | Cohen et al. | 345/619 |
| 8,335,982 | B1 * | 12/2012 | Colton et al. | 715/234 |
| 2004/0093564 | A1 * | 5/2004 | Kumhyr et al. | 715/526 |
| 2009/0019048 | A1 * | 1/2009 | Pendergast et al. | 707/8 |
| 2014/0033068 | A1 * | 1/2014 | Gupta et al. | 715/751 |

* cited by examiner

*Primary Examiner* — Jeffrey A Burke
(74) *Attorney, Agent, or Firm* — Patent Law Works LLP

(57) ABSTRACT

In a collaborative computing environment, a method and system for displaying revisions associated with a hosted electronic document are disclosed. In accordance with the disclosed method and system, select revisions of an electronic document may be displayed to a user, recreating a visual history play-back of the evolution of the electronic document. The electronic document may be displayed in a web-browsing application, utilizing a Document Object Model ("DOM") retrieving the select revisions via Asynchronous JavaScript and XML ("AJAX") calls to a remote device/server.

20 Claims, 22 Drawing Sheets

PRESENTATION OF DOCUMENT HISTORY IN A WEB BROWSING APPLICATION

FIELD OF INVENTION

The present invention relates to document creation and collaboration systems. More particularly, the present invention relates to utilizing a document object model ("DOM") and related client-server technologies to present revisions of a hosted electronic document within a web-browsing application, whereby selected revisions of the electronic document are presented in a superimposed sequence.

BACKGROUND OF THE INVENTION

Electronic device users are increasingly able to collaborate on an ever-growing number of types of documents and projects, online. Users are able to access documents, hosted by application providers online, from their electronic devices, typically via a web-browsing application. Google Docs™, Microsoft Office Live™, collaborative internet/intranet websites such as wikis, etc., are examples of services allowing users to create various types of documents (e.g. word processing, spreadsheets, presentation, etc.) online and invite other people to revise these documents remotely. Changes to a document made by users are captured in the form of document revisions. A user, accessing a shared online document, may view various "states" of the document, where a state (also referred to as a revision) of a document may include changes made by other users. The changes are usually delineated by different colors, fonts, formatting, notations, etc.

At present, while document revisions are captured and can be listed in chronological order, there is no convenient and efficient way to present to the user a logical "story board" of the changes made by various users. The user can compare any two revisions and be displayed the differences between the revisions in different colors, but each revision is a snap-shot of the document at a point in time, with no visual connection to other revisions of the document. Changes made by one user may be in response to other changes made by a second user and may be later un-done by a third user. Thus a document evolves in response to changes made by various users, and it becomes necessary—and an unfulfilled need in the prior art—to allow the user to observe the evolution of the document (or a portion of the document) as a continuum, and not as discrete snap-shots of revisions, as taught in the prior art.

DESCRIPTION OF THE DRAWINGS

For a more complete understanding of the present invention and further advantages thereof, references are now made to the following Detailed Description, taken in conjunction with the drawings, in which.

SUMMARY OF THE INVENTION

In a collaborative computing environment, a method and system for displaying revisions associated with a hosted electronic document are disclosed. In accordance with the disclosed method and system, select revisions of an electronic document may be displayed to a user, recreating a visual history playback of the evolution of the electronic document. The electronic, document may be displayed in a web-browsing application, utilizing a Document Object Model ("DOM") retrieving the select revisions via Asynchronous JavaScript and XML ("AJAX") calls to a remote device/server.

A timeline may be presented to the user, displaying a graphical representation of various revisions of the electronic document. The timeline may act as an input control, allowing the user to select one or more revisions. A sequence of revisions may be automatically traversed, in a playback-fashion, superimposing revisions of the document on top of each other, created a playback effect of the electronic document morphing between revisions. The user may control the attributes of the playback: speed and direction of the playback, zoom and pan, etc.

DETAILED DESCRIPTION

Figure 1A:
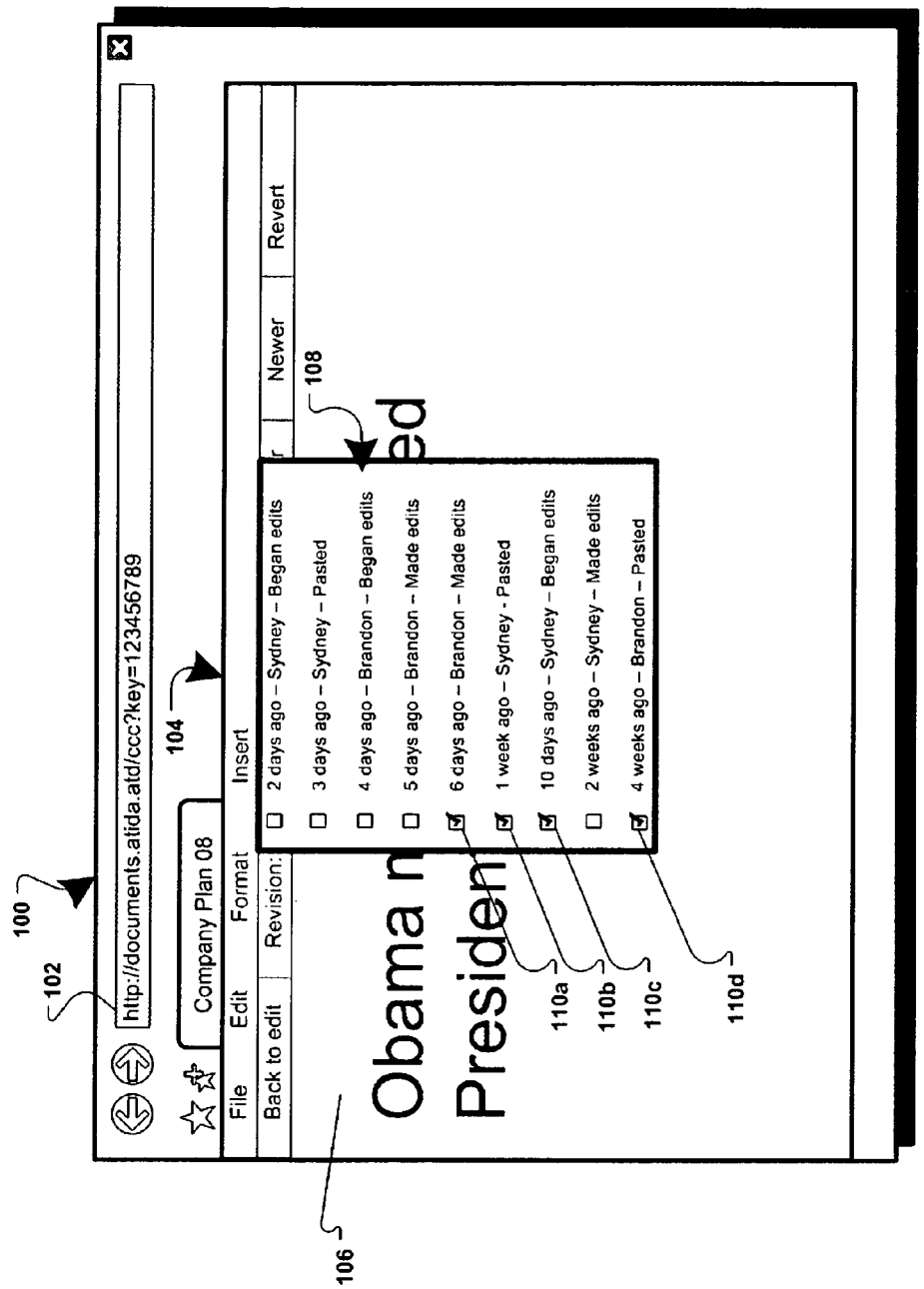
FIGS. 1A, 1B and 1C are generalized block diagrams illustrating displaying document revisions of a hosted document, according to one embodiment of the present invention.
Figure 1B:
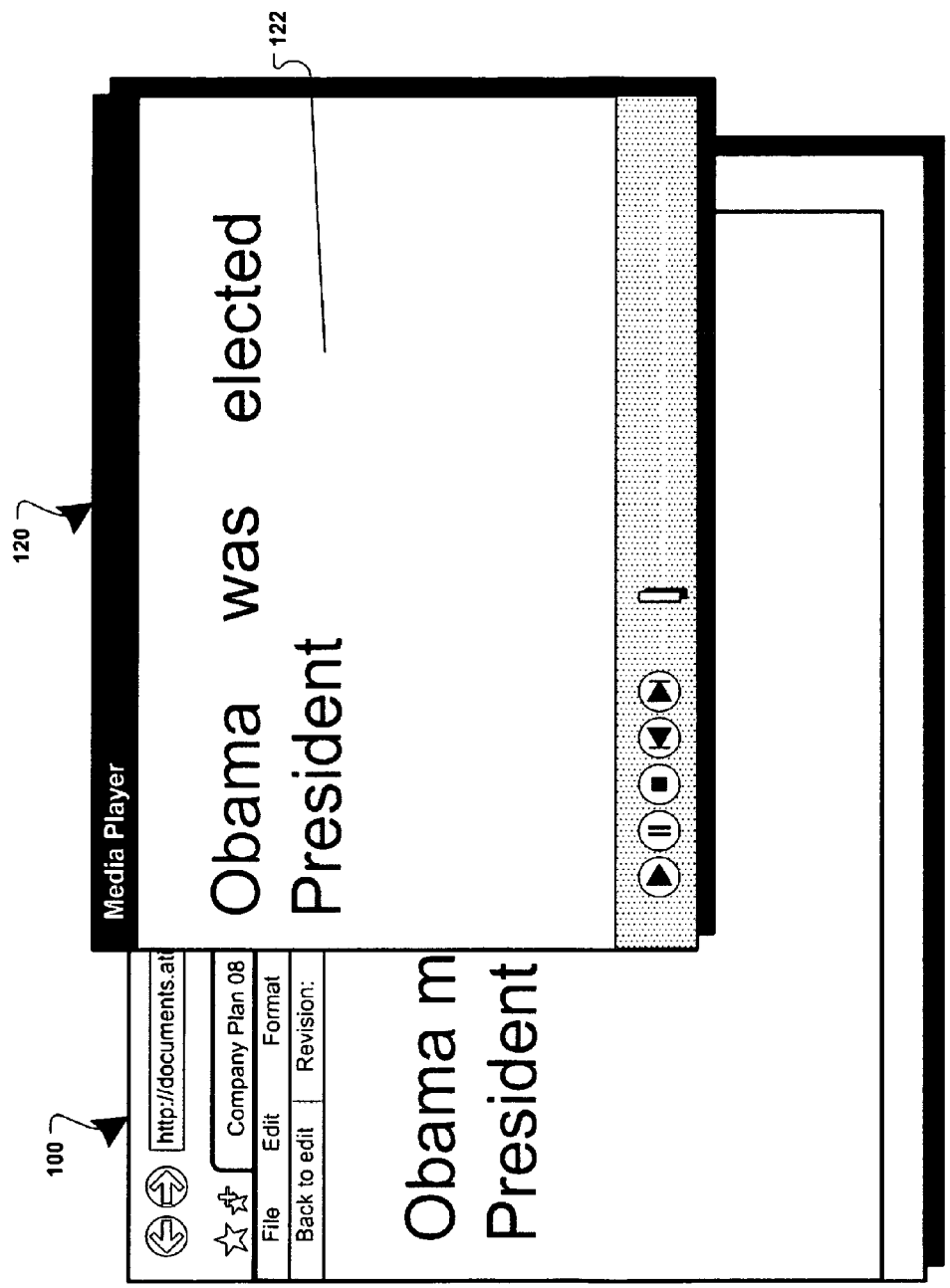
Figure 1C:
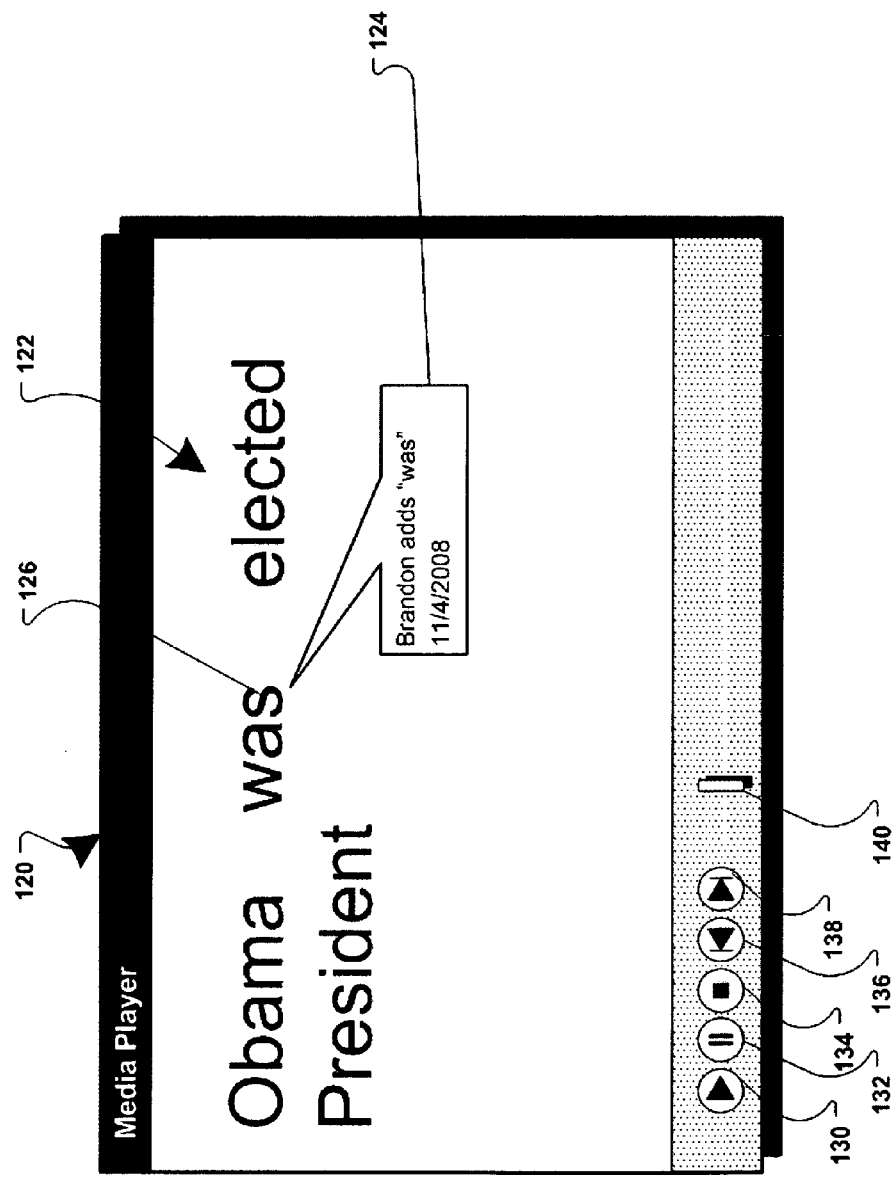

FIGS. 1A, 1B and 1C are generalized block diagrams illustrating displaying document revisions of a hosted document, according to one embodiment of the present invention. A document "in the cloud" (i.e. hosted remotely, as in a SaaS model) may be accessed via a web-browsing application ("web browser"). For example, a document (e.g. a word-processing document, a spreadsheet, a presentation, etc.) may be hosted by Google Docs™, Google Wave®, Microsoft Office® 2010, Microsoft Office Live™ or a similar service. Multiple users may use web browsers to make modifications to the document. The modifications made by the various users are captured in the document (more precisely, the hosting service stores the modifications in association with the document). In one presently-preferred embodiment, the users are displayed an animation of the revisions.

Referring to FIG. 1A, in the prior art, a web browser 100 may access a remotely-hosted document whose location is commonly denoted by a URL/URI (Uniform Resource Locator/Identifier) 102. The hosted document 106 may be displayed in a web page 104 of the web browser 100. Multiple remote users may be able to access the document 106 from their web browsers, and make modifications to the document. The modifications are saved as revisions associated with the document 106. A list of revisions 108, associated with the document 106, may be displayed to the user. The user may select one or more revisions and choose to view former revisions, revert to a former revision, or compare any two former revisions.

Referring now to FIG. 1B, in the one presently-preferred embodiment, a media player 120 (e.g. Windows™ Media Player, QuickTime™ player, RealPlayer™, iTunes™, Rhapsody™ player) may display an animation/movie-clip 122. The animation./movie-clip 122 may be an animation of revisions of a document. In this example, referring now also to FIG. 1A, user-selected revisions 110a, 110b, 110c and 110d, of the document 106, may be animated into a movie-clip and displayed by the media player 120.

In one embodiment, the media player 120 may play the movie-clip 122 off of a live media stream from a remote server. In an alternate embodiment, the media player 120 may play the movie-clip 122 from a file on the local electronic device (or saved on a local network or a storage device accessible to the electronic device.) In yet another embodiment, the media-player 120 may be a plug-in of the web browser 100 (e.g. an Adobe™ Flash™ plug-in) and may play the movie-clip 122 within the web browser 100 (please refer to FIGS. 6A and 6B for further discussion of this alternate embodiment.)

Referring now to FIG. 1C, the media player 120 may allow the user to control the display of the media-clip 122. The user may use common media controls such as "play" 130, "pause" 132, "stop" 134, "rewind" 136, "fast-forward" 138, a slider-control 140 etc., to control the speed and direction of the playback of the movie-clip 122. The slider control 140 may allow the user to control the frames of the movie-clip 122, where each frame may correspond to a revision of the document 106 (please refer to FIGS. 2A-2C for a discussion of the correlation of frames and revisions.)

The movie-clip 122 may contain animation which morphs various document revisions into one another. Various colors may be used to delineate changes made by one user in one revision (e.g. the word "was" 126 appearing in a darker shade than the rest of the sentence "Obama elected President"). Balloons 124 "Brandon adds 'was' Nov. 4, 2008" may be displayed in the movie-clip 122 to further incorporate and display revision-related information association with the document 106.

The movie-clip 122 may be comprised of all the revisions previously chosen by the user (e.g. revisions 110a, 110b, 110c and 110d, of the document 106), whereby each revision is represented by at least one frame in the move-clip 122. Animation/morphing effects may be used in the compilation of the movie-clip 122 to create a smooth visual "blending" effect of one revision into the next. The user may use various media-player controls to control the display of the movie-clip 122. For example, the user may control the direction of the playback movie-clip and the speed at which it is played (e.g. the user may choose to play "backwards in time", slowly, where more recent revisions made by a user "melt away" and morph into earlier revisions of the document prior to more recent changes.) In alternate embodiments, the user may be able to pan around the movie-clip 122 within the media player 120, zoom in and zoom out, etc.

Figure 2A:
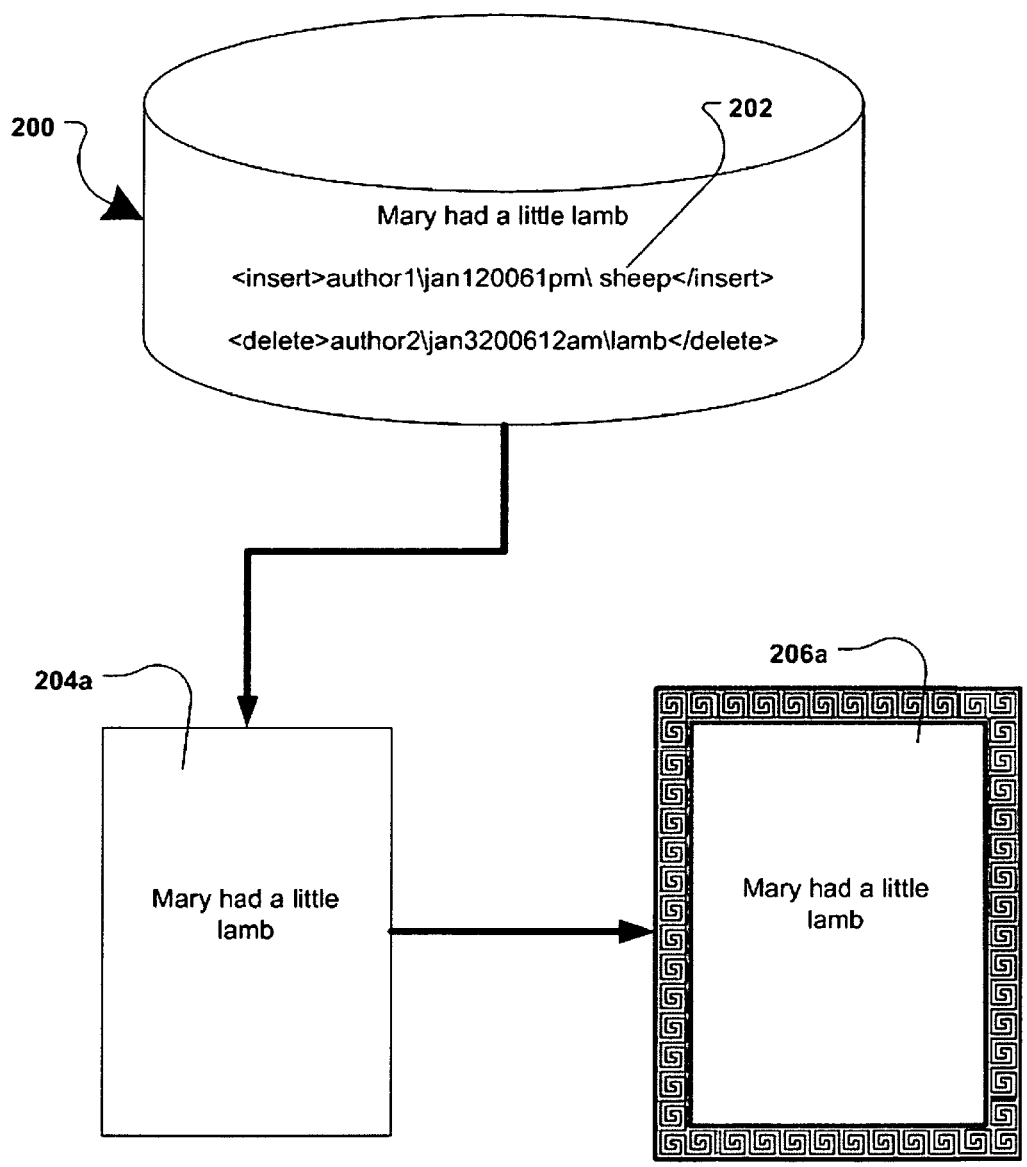
FIGS. 2A, 2B and 2C are generalized block diagrams illustrating conversion of document revisions stored in association with a document, into an animation/movie clip, according to one embodiment of the present invention.
Figure 2B:
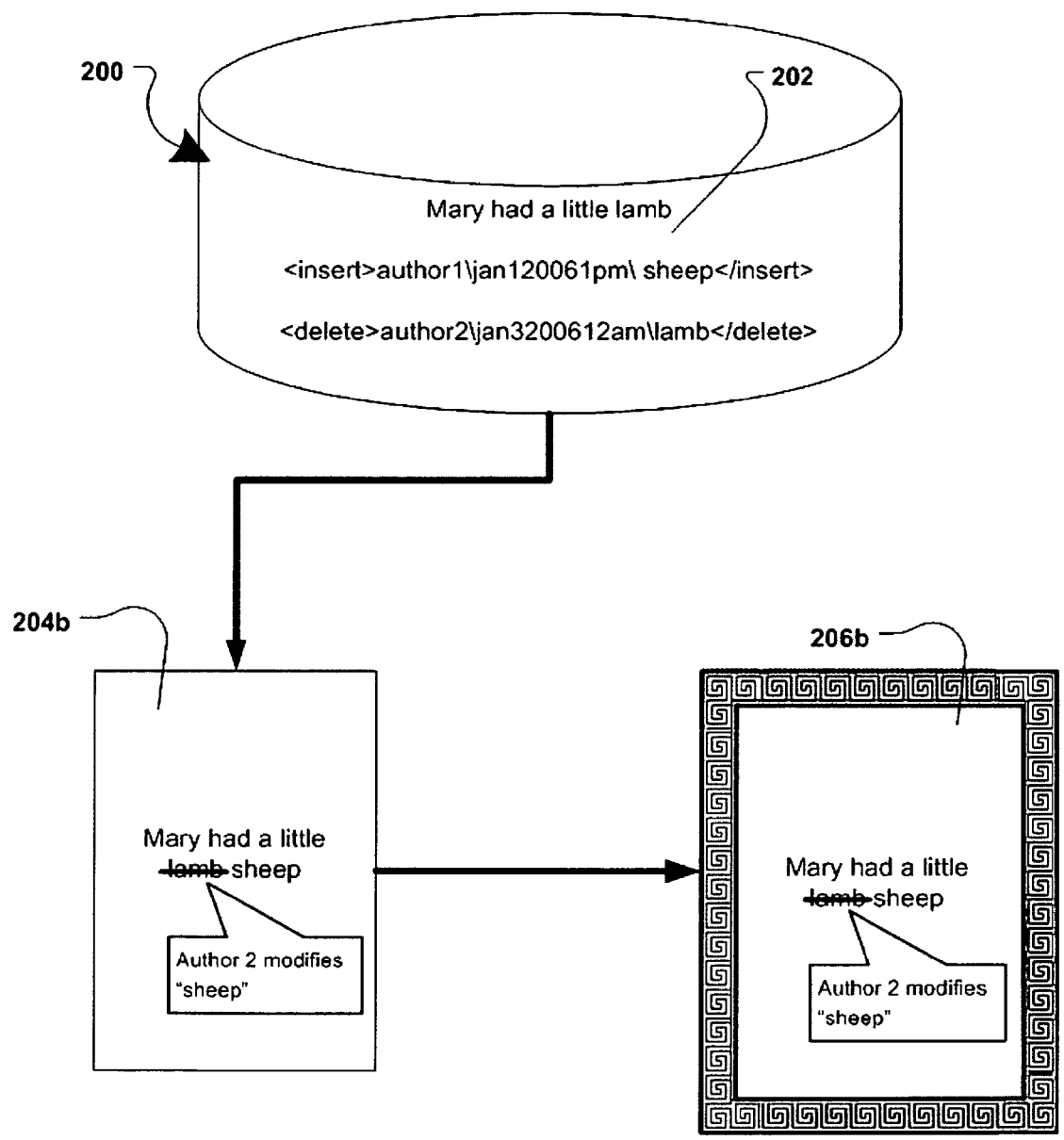
Figure 2C:
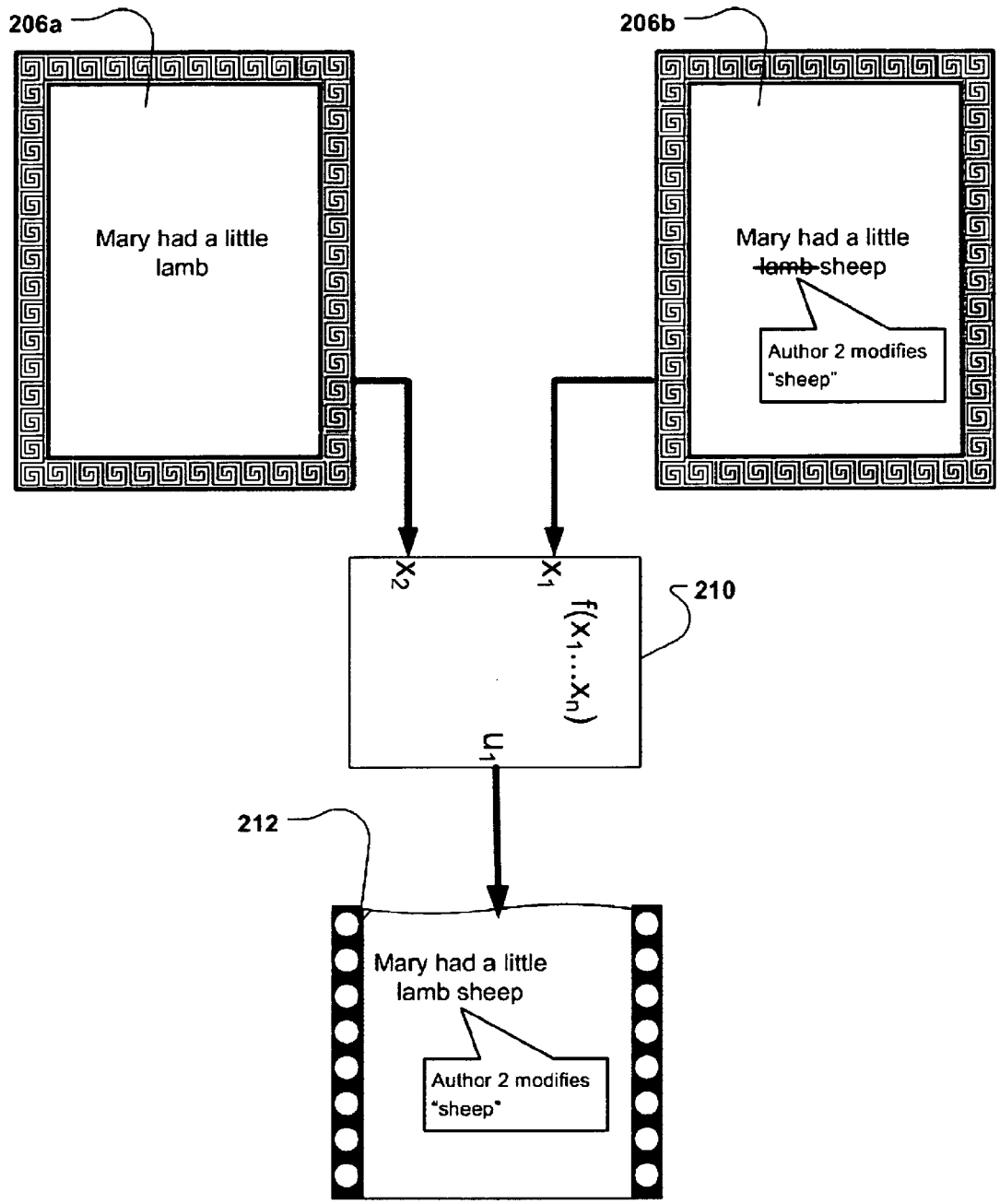

FIGS. 2A, 2B and 2C are generalized block diagrams illustrating conversion of document revisions stored in association with a document, into an animation/movie clip, according to one embodiment of the present invention. Revisions to a document, which may be stored in a hosted data store, may be converted to images and further converted into a media clip (e.g. leveraging technologies such as Adobe® Flex, Microsoft® Silverlight, JavaFX) and/or an animation-like graphical presentation (e.g. leveraging technologies such as HTML, DHTML, Python, Java, PHP, etc.)

Referring to FIG. 2A, a data store 200 (e.g. a data store of a S.a.a.S. provider such as Google™ Docs) may contain document/revision data 202. The document/revision data 202 may include document information and related information on revisions of the document. The document/revision data 202 may be sufficient to define and recreate a document, revisions to the document, and additional notes on the revisions. For example, the document/revision data 202 may encompass the sum of information accessed by a user's web browser to display a hosted document.

In one presently-preferred embodiment of the invention, the document/revision data 202 may be used to recreate revised states of a document, based on revisions chosen by a user. For example, a user may choose two random revisions from a list of revisions applicable to the document. In response, the first revision of the document 204a may be constructed. In the presently-preferred embodiment, the first revision 204a may be constructed in the remotely-hosted environment, i.e. invisible to the user. In alternate embodiments, the first revision 204a may be rendered on the client's electronic device, e.g. within a web browser.

A first revision image 206a of the first revision 204a may be created. Various common back-end tools may be used to render the first revision image 206a from the first revision 204a. In various embodiments, the first revision image 206a may include an image of any portion of the first revision 204a, and may be subject to various settings, such as resolution, color-depth, size, etc.

Referring now to FIG. 2B, a second revision 204b may be recreated from the document/revision data 202. A revision may include various common mark-ups denoting changes to a document (e.g. words underlined, crossed-out, displayed in different colors, balloons pointing to—and containing information on—changes, etc.) A second revision image 206b may be constructed to capture a visual representation of the second revision 204b (with similar embodiments discussed above for the creation of the first revision image 206a.)

Referring now to FIG. 2C, revision images may be combined into a media clip. The first revision image 206a may be combined with the second revision image 206b to form content within a media clip 212. The media clip 212 may be an animation/media file (such as an Adobe™ Flash file.) The media clip may be created via API (application programming interface) functions made available by the media-creation application.

One of the API functions may be a morphing function 210, which may combine the revision images 206a and 206b by creating a series of frames containing the images, morphed into one another. For example, the resulting media file 212 may contain n frames representing the transition of the revision image 206a into the revision image 206b, where:

Frame 1 contains the revision image 206a,

Frame 2 contains primarily the revision image 206a with a small trace of the revision image 206b, Frames 3 through Frame n−1 contain a progressively-decreasing revision image 206a combined with a progressively-increasing image 206b, and Frame n contains the revision image 206b. The morphing function 210 may be invoked with various parameters controlling the morphing effect and may be set to produce animation clips of various lengths and properties.

The process may be repeated for all selected revisions, where each new selected-revision is combined and morphed with the previously-selected revision such that the media clip 212 contains an animation and morphing of all selected revisions into one another. Please note that the present invention is not restricted to one particular method of creating an animation, but rather illustrates one simplified method whereby animation is created from morphing two images at one time, and repeating the process for all successive images. In alternate embodiments, the application used to generate the media clip 212 may be utilized in different ways to create animation; for example, a series of revision images—each representing a snapshot of a selected document revision—may be passed into the animation-creating application, and an animation clip may be produced automatically, based on various predefined settings.

Figure 3:
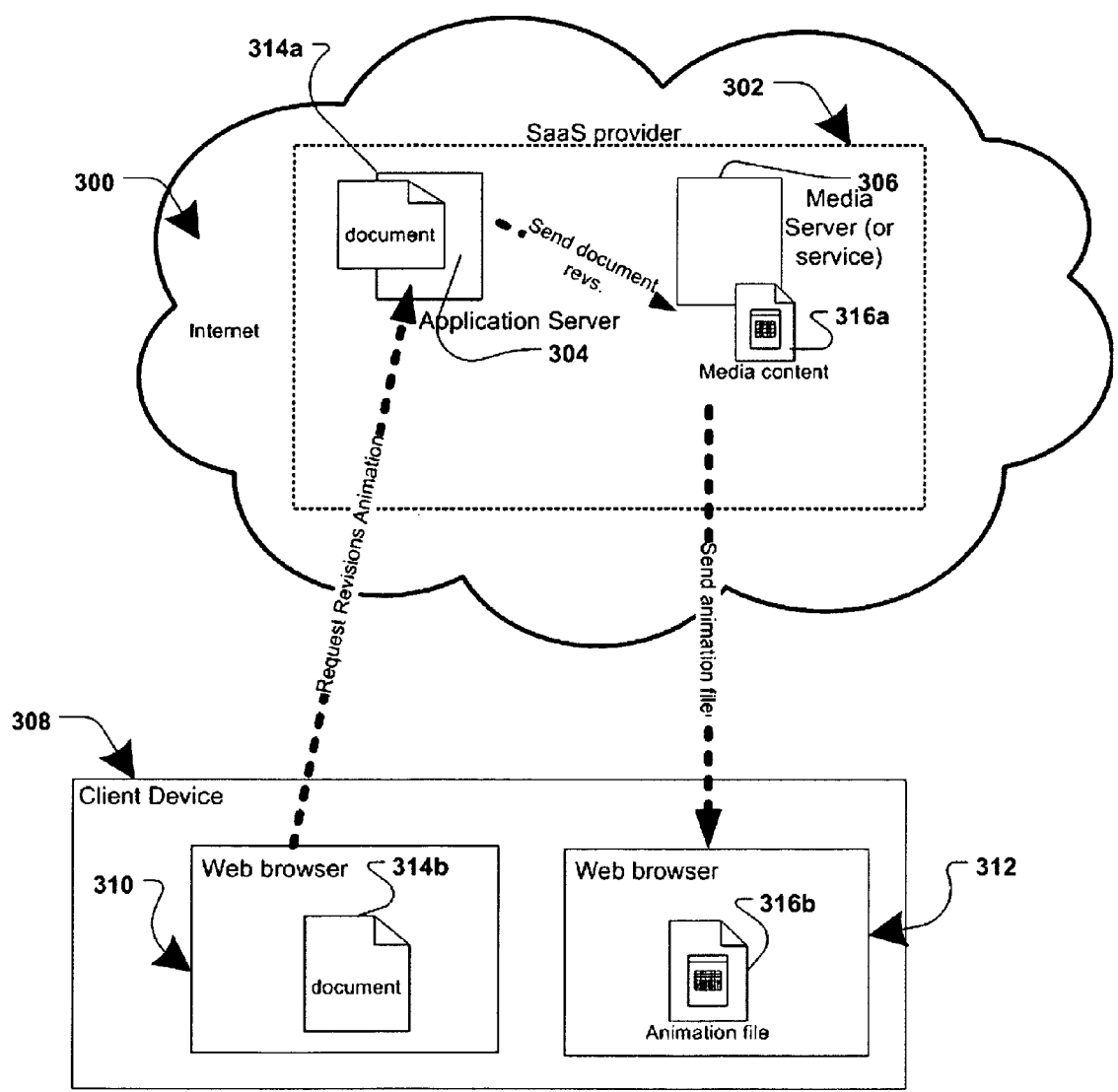
FIG. 3 is a generalized block diagram illustrating a system, compatible with a cloud computing (or SaaS), where document revisions are generated as media and are displayed on a client device, according to one embodiment of the present invention.

FIG. 3 is a generalized block diagram illustrating a system, compatible with a cloud computing (or SaaS), where document revisions are generated as media and are displayed on a client device, according to one embodiment of the present invention. In the prior art, document revisions of a hosted document are displayed only as part of the document itself and within the same container as the document (e.g. within the same web browser.) According to the present embodiment of this invention, a media-clip (or media content), containing visual representation of a document's revisions, may be displayed separately from the display of the document.

A SaaS provider 302 (e.g. a hosted application provider such as Google™ Docs, Microsoft Office Live™, etc.) resides in a cloud 300 (i.e. a network such as the internet or an intranet). A client device 308, connected to the cloud/network 300, can access a document hosted by the service provider 302. The client device 308 may utilize a web browser 310 (or an equivalent applications with web access on a mobile device) to access data-of-a-hosted-document 314a on an application server 304 of the service provider 302. The web browser 310 may display the data-of-a-hosted-document 314a to the user of the client device 308, as a document 314b.

In response to a request from the user to view an animation of revisions of the document 314b, the web browser 310 may transmit an instruction to the application server 304 to produce a media-clip of the data-of-a-hosted-document 314a. As discussed in FIGS. 2A-2C, a media content 316a may be automatically produced from revisions of a document on a media server 306 (which may be a separate physical server from the application server 304, or may be an application running on the application server 304, or may be a remote service providing media-creation services, or a remote media hosting site such as YouTube™, etc.) The media content 316a may contain a visual representation of various revisions in the data-of-a-hosted-document 314a.

The client device 308 may download and/or stream the media content 316a and display the media-clip 316b to the user (a user-facing representation of the media content 316a). In one possible embodiment, shown in FIGS. 7A and 7B, the web browser 310 may, in conjunction of the transmission of the instruction to the application server 304 to create the media content 316a, launch another web browser 312 with the address (e.g. a URI) of the media content 316a. In another possible embodiment, the web browser 310 may initiate a plug-in, application, gadget or any other component on the client device 308, to access and display (i.e. play) the media-clip 316b off of the media content 316a on the media server/service 306.

In alternate possible embodiments, various other methods may be utilized to allow a user to select revisions of a remotely-hosted document, creating media content from the selected revisions and displaying the media content to the user.

FIGS. 4A, 4B, 4C and 4D are generalized block diagrams illustrating selection of a region of a displayed document and animation of revisions in that region, according to one embodiment of the present invention. Changes to a document made by one user may affect various portions of the document, requiring a second user to scroll through the document to observe the various changes. In this embodiment, only one select region of the document is displayed and thus only changes affecting the one region are displayed, as document revisions are traversed.

Figure 4A:
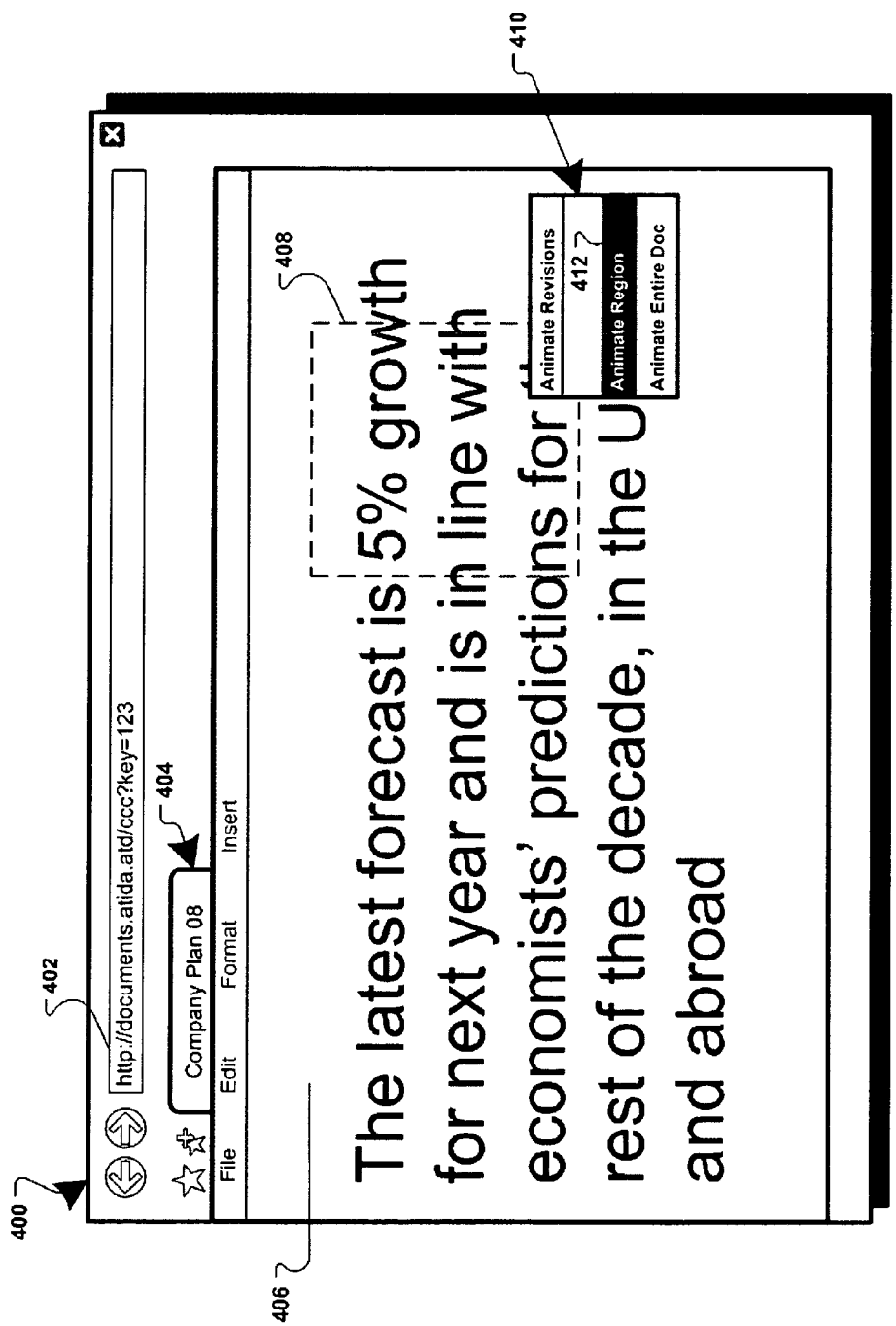
FIGS. 4A, 4B, 4C and 4D are generalized block diagrams illustrating selection of a region of a displayed document and animation of revisions in that region, according to one embodiment of the present invention.
Figure 4B:
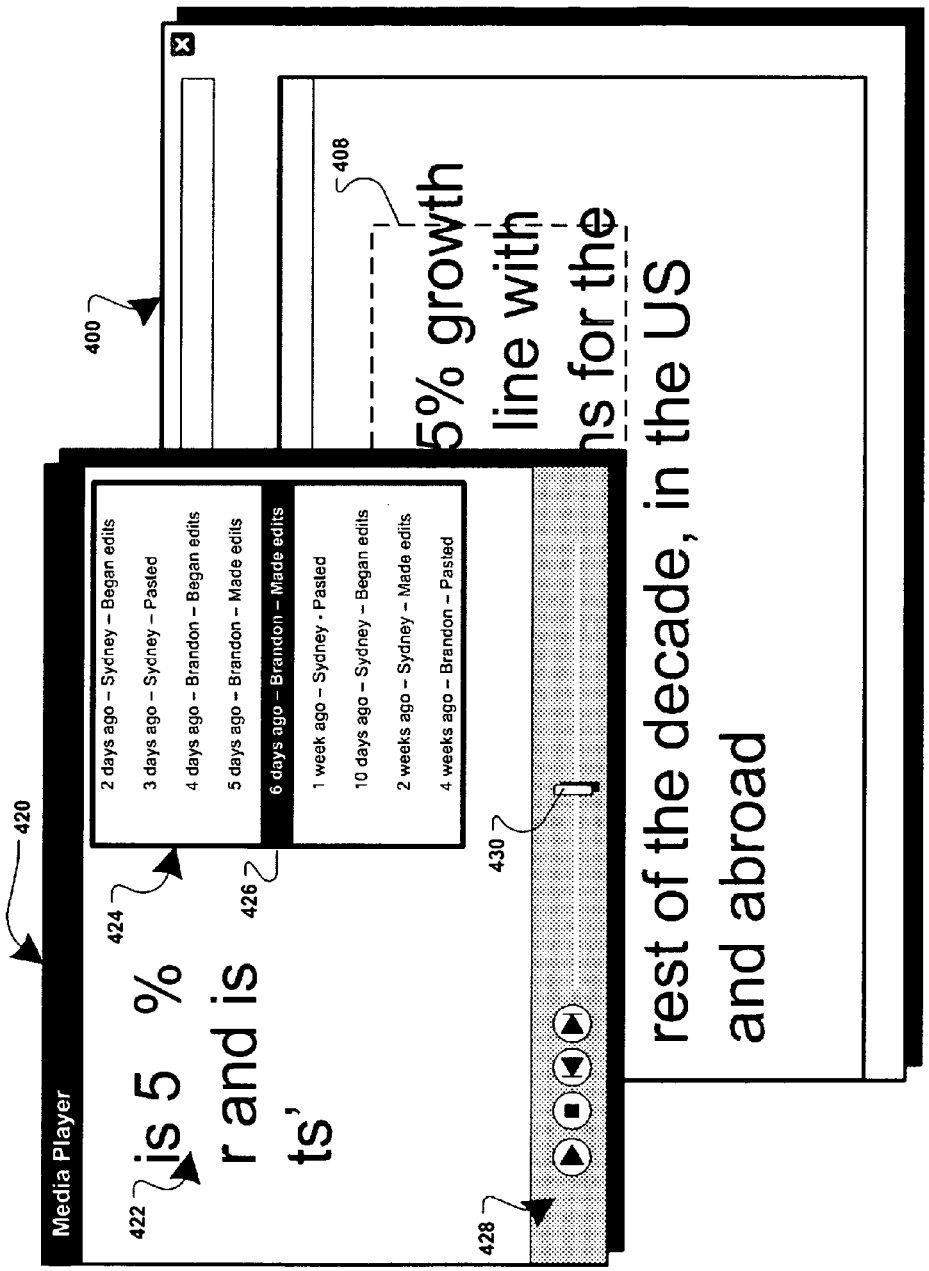

Referring to FIG. 4A, a web browser/browsing application ("browser") 400 is illustrated displaying a document 406. The document 406 may be hosted remotely (e.g. at URL address http://documents.atida.atd/ccc?key=123 402) and displayed in a tabbed browser-page 404 within the browser 400. The browser 400 may be a PC-based web browser (e.g. Internet Explorer®, FireFox™, Safari™, Chrome™, Netscape®, etc.), or a web-browsing application on a mobile device (e.g. BlackBerry® web browser or any other hand held/smart phone browser.)

A user may select a region 408 of the document 406. The selection of the region 408 may be done in various ways, such as using GUI methods (e.g. a selection tool, a lasso, a highlighting tool, a touch-based selection methodology, etc.) After selecting the region 408, the user may choose a function to animate revisions applicable to the selected region 408. In one possible embodiment, the user would choose a function from a context-menu invoking revision playback applicable to the selected region 408. For example, after selecting the region 408, the user may right-click their mouse (or the equivalent function in any other pointing device) and in response, a context menu 410 may be displayed. The user may then select an animation function (e.g. "Animate Region" 412) from the context menu 410.

In alternate embodiments, the user may also select specific revisions, e.g. based on revision authors, timelines, etc. The context menu 410 may contain other additional functionality, including choosing types of animation, revisions and other functionality. In response to the user's issuing the animation command 412, referring now to FIG. 4B, a media player 420 may be displayed. The media player 420 may display animated content 422, which corresponds with the selected region 408. The media player 420 may include standard playback controls 428 (e.g. "play", "pause", "stop", "fast-forward", "rewind", "skip", a slide-bar 430, etc.)

A list of revisions 424 may be displayed. The list of revisions 424 may display various information on the revisions, and may indicate the current revision animated 426. The user may use the slide-bar control 430 (or any other control) to advance and go back trough revisions in the list of revisions 424. In alternate embodiments, the user may select specific revisions for playback and may choose settings such as the speed of the playback, the direction (i.e. going "forward" or "backwards" in history), etc.

Figure 4C:
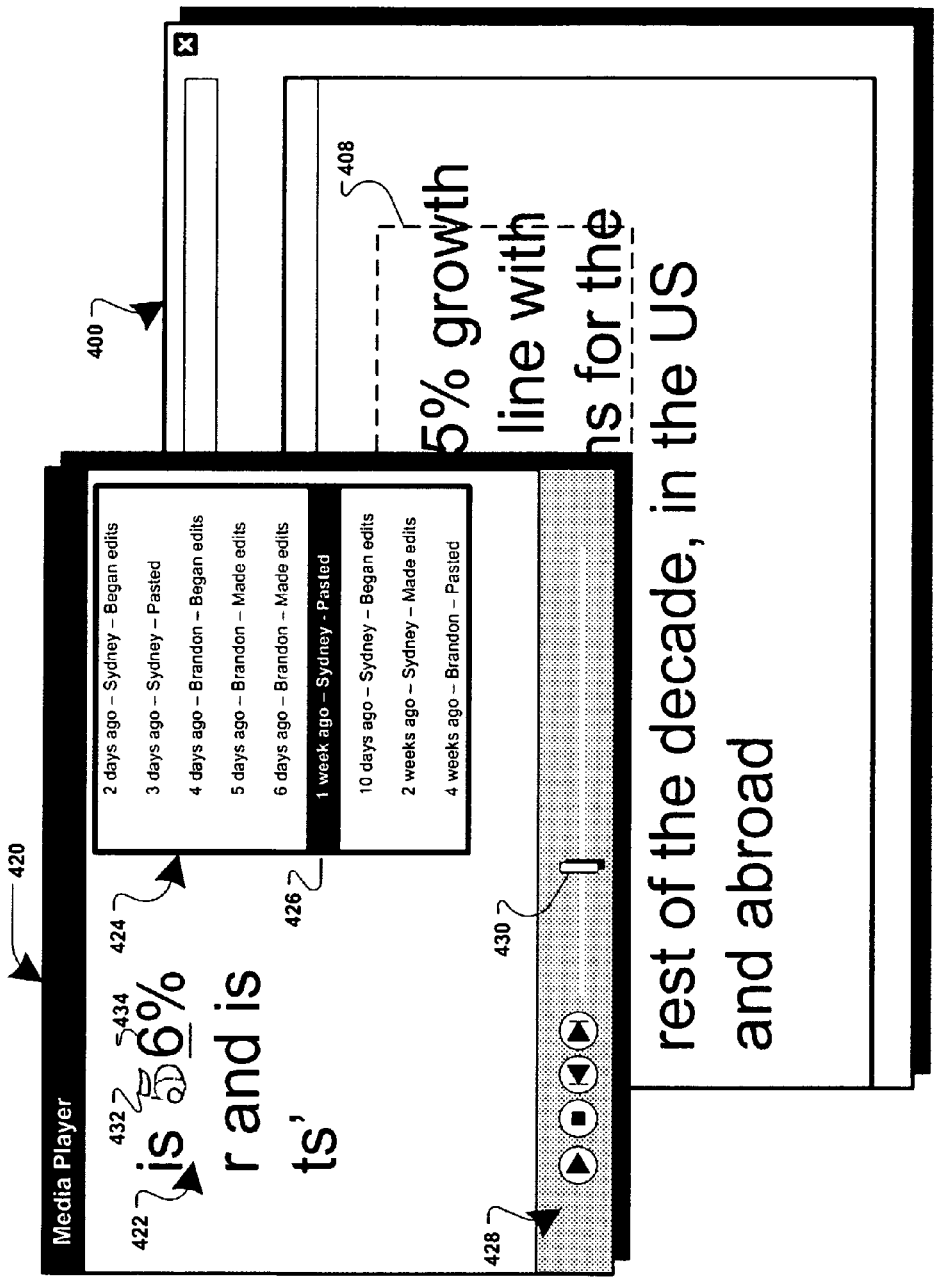
Figure 4D:
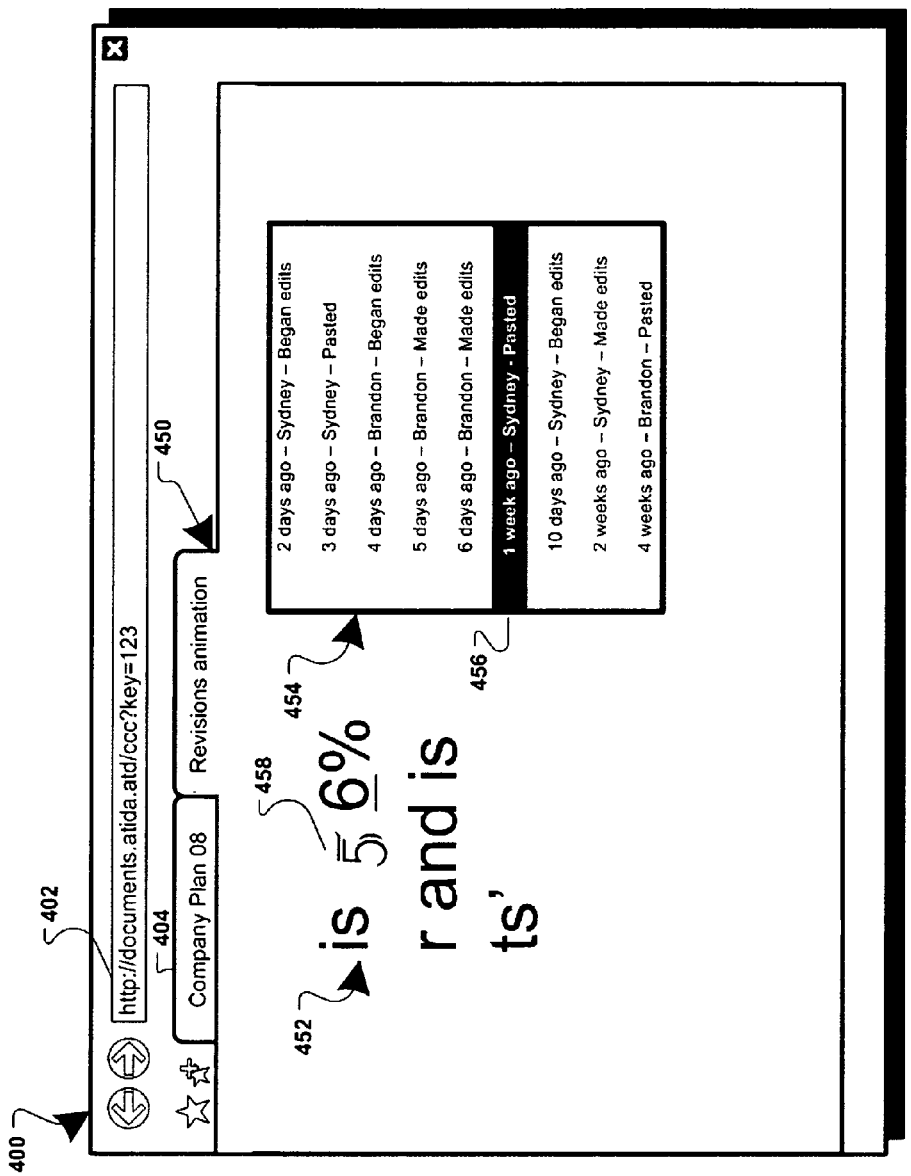

Referring now to FIG. 4C, the animated content 422 may be presented as an alternating sequence of translucent images 432 and solid images 434 (represented in FIG. 4D as hollowed-out fonts and underlined fonts, respectively, for illustrative purposes.) The animated content 422 may represent the "chronological replay" of the revisions selected 424, appearing to the user as an evolving document. For example, the revision labeled "1 week ago—Sydney—Pasted" 426 may be contain, and thus be displayed as a letter "6" 434, fading into view in response to advancement of the timeline of the chronological replay.

Referring now to FIG. 4D, in an alternate embodiment, animated content 452 may be displayed in a separate tab/browser page 450 (in this example, titled "Revisions animation".) The animated content 452 may contain transparency 458, for example when animating a transition. (Please note that in diagram 4D, the transparency is in the shape of a number "5" 458 and is presented as an outline of the number "5" merely as in illustration of a transparency.)

In the alternate embodiment illustrated in FIG. 4D, the tab/browser page 450 may automatically display the animated content 452, associated with a document being edited in a separate tab/browser page 404. The animated content 452 may be automatically updated in response to changes to, and events generated in association with, the document edited in the tab/browser page 450.

In other alternate embodiments, animated content associated with a document may be displayed on electronic devices (e.g. mobile phones) that may not be displaying the document. For example, the electronic device may display animated content of a document hosted remotely, separately from the document itself which may at the same time be edited via another electronic device.

In other alternate embodiments, animated content may be created on the client's device. For example, a browsing application on the client's electronic device may download all revisions from a server and create animated content from the revisions.

Figure 5A:
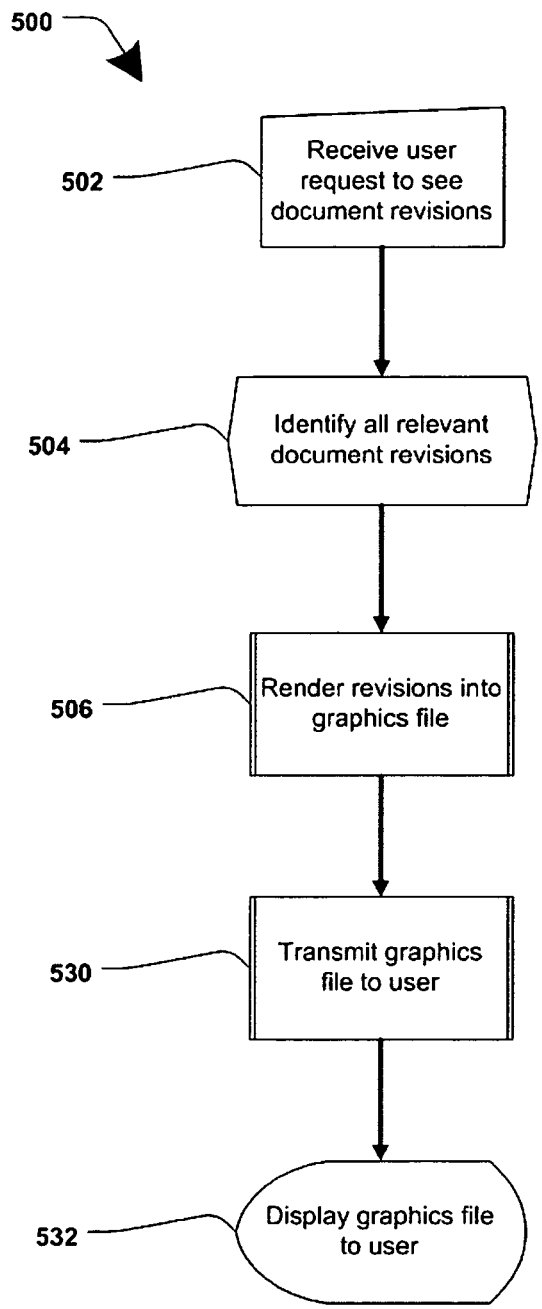
FIGS. 5A, 5B and 5C are generalized flow diagrams illustrating creating and displaying animated content, associated with document revisions, according to one embodiment of the present invention.
Figure 5B:
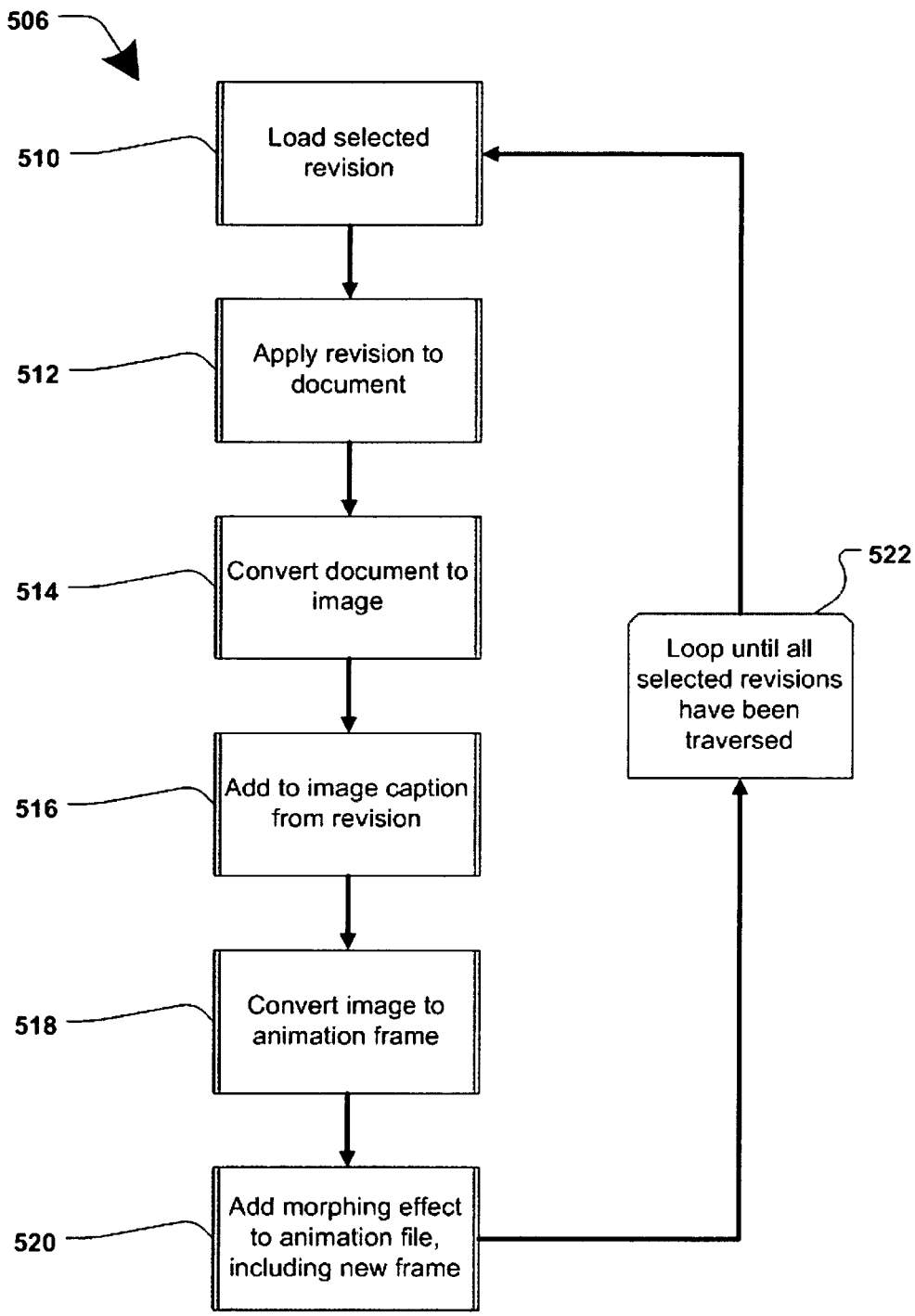
Figure 5C:
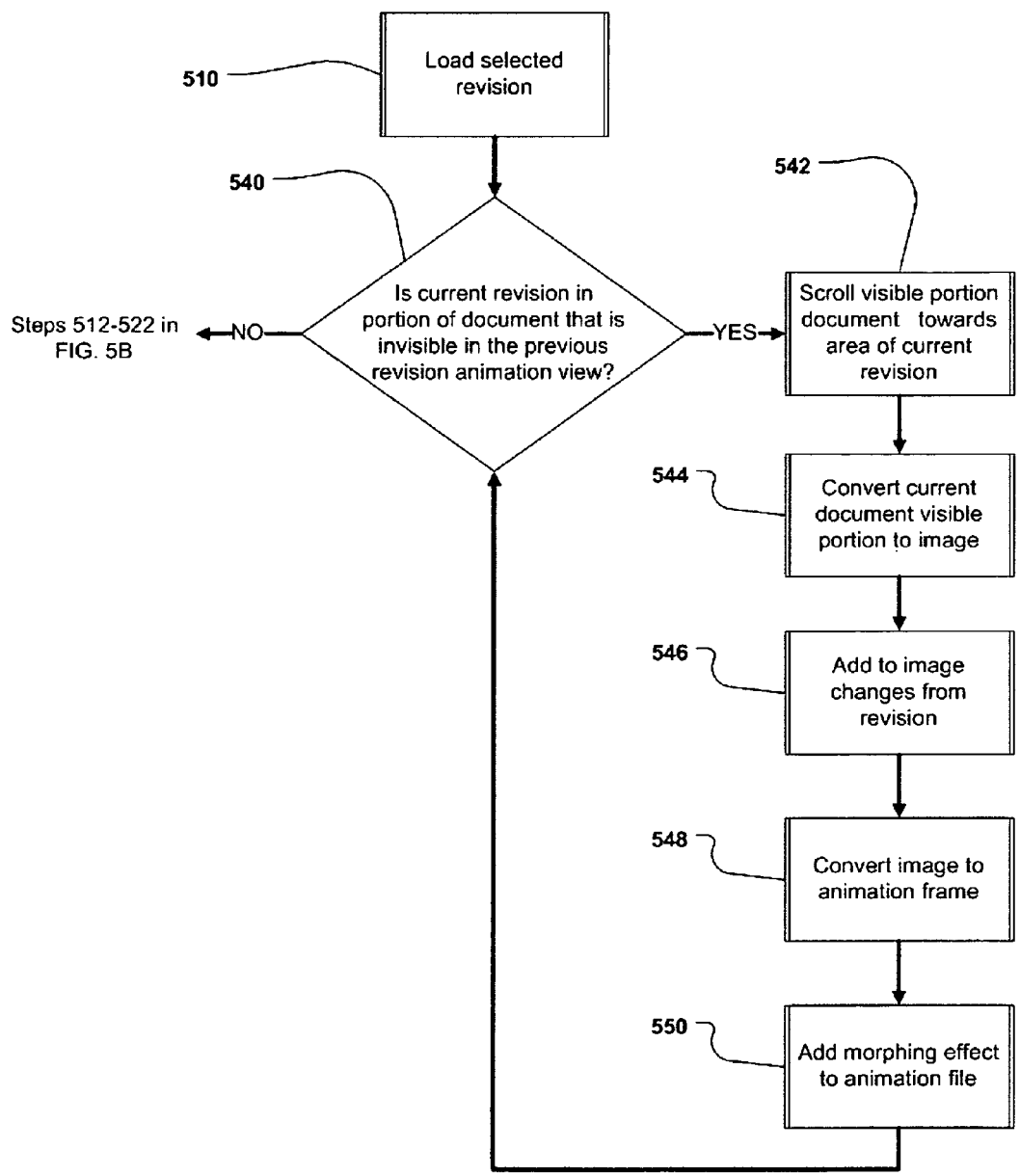

FIGS. 5A, 5B and 5C are generalized flow diagrams illustrating creating and displaying animated content, associated with document revisions, according to one embodiment of the present invention. In cloud computing, documents are hosted by a server and are editable/viewable by a client using an electronic device (e.g. a mobile phone, computer, etc.) using a web-browsing application (or an application to display documents over a network.)

Referring to FIG. 5A, flowchart 500 illustrates steps for generating and displaying revision-animation content to a user. At step 502, a user request for revision animation content is received. The user may submit the request from a client-sided interface (e.g. a GUI control on a document-editing browser/application, from a Gadget, etc.) The request may be received by the server hosting the document (or by a server associated with the server hosting/serving the document.)

At step 504, all revisions to be included in the revision-animation may be identified. The user may have selected a range of revisions based on date or any other criteria. Alternatively or in addition to, the user may have selected various specific revisions.

At step 506 (illustrated in further detail in FIG. 5B), the selected document revisions may be rendered into a graphics/media file. For example, a media file such as a Flash™ file, composed of the selected revisions, may be created.

At step 530, the graphics/media file is transferred to the user. The transfer may be accomplished in many various common ways of electronic media transmission: via download, streaming, Ajax, XMPP and other protocols, technologies and methods.

At step 532, the graphics/media file may be displayed to the user in a web browser, media player, or via any other media-display application. The user may control the properties and presentation of the displayed media (e.g. playback direction, speed, size, etc.)

In FIG. 5B, step 506 of FIG. 5A is illustrated as a smaller series of steps 510-522. At step 510, selected revisions of the document may be loaded, starting with retrieval of information on the first selected revision.

For example, the user may select any number of revisions—made by various users, at various times, etc. The revisions (or information sufficiently describing the revisions to reconstruct the document per each revision) may be retrieved. For example, if a currently-selected revision is a hypothetical revision made by a User A on Dec. 23, 2008 at 6 pm, information for presenting the document inclusive of all changes in that revision, is retrieved.

At step 512, all information retrieved at step 510, in association with the current revision, may be applied to the document. For example, any textual changes made to the document in the current revision, such as deleting a word, may be applied.

At step 514, the post-revision document created at step 512 may be captured-as/converted-to an image, or as an animation frame. In one possible embodiment, an animation/movie may be created by capturing and combining images of all revisions. In other possible embodiments, other methods may be used to capture a visual representation of the post-revision document.

At step 518, the captured image may be converted into an animation frame in a media-type file (e.g. Adobe® Acrobat movie, Flash® animation, etc.) At step 520 (which may be combined with step 519 in alternate embodiments), an animation effect (e.g. fading) may be added. For example, as the current revision is added to the animation file, a graphical transition, such as the previous revision smoothly morphing into the current revision, may be added.

At step 522, a determination is made whether all the selected revision have been added to the media file, thus the steps 510-520 may be repeated until all the revisions have been added. In an alternate embodiment, an animation-producing program may receive all revisions as input, and may output an animation file, in a manner similar to, but not strictly following, steps 512-520.

FIGS. 5A and 5B illustrate a server-sided operation, wherein the media animation file is generated on a server and becomes available to a user (client) over a network. In an alternate embodiment, one or more of the steps illustrated in FIGS. 5A and 5B may be performed on the user's electronic device. For example, revision data may be transmitted from the server to the client machine (i.e. user's device, using XML, AJAX, XMPP, or any other method) and the revision data is converted into a media animation file on the user's electronic device (for example in a web browser, via a plug-in application, a widget, etc.)

In yet another possible embodiment, illustrated in FIG. 5C, the steps associated with creating an animation off the revisions of the document may also include steps to pan/scroll the document such that the region of the document affected by a the current revision is automatically scrolled into view. For example, a "Revision A" may contain a change to line 10 of a document. Adjacent lines 5-15, with line 10 centered, may be displayed in the animation media when the "Revision A" animation is played back. If the next "Revision B" contains changes to a line 100 of the document, the animation may include animation of scrolling the document to make line 100 visible, and then displaying "Revision B".

Referring now to FIG. 5C, the step 510 (from FIGS. 5A and 5B) of loading a selected revision, may be followed by a step 540 of determining whether the changes in the revision affect the same portion of the document as the previous revision. If at step 540 it is determined that the current revision is in a portion of the document that is invisible in the previous animation view, steps 542-550 may be executed, scrolling the document to include areas of the documents containing revisions, in the revision animation media. Otherwise, a negative determination at step 540 may lead to execution of the step 512-522 previously described in FIG. 5B.

At step 542, the document may be automatically scrolled to make the area of the document containing the current revision, visible. For example, if a "page 1" of the document has been displayed in relation to the last revision, and the current revision is on "page 5", at step 542 the document may be scrolled to "page 5". At step 544, the visible portion of the document—"page 5" in this example, may be converted to an image. At step 546, changes from the current revision may be added to the image. At step 548, the new image formed may be turned into an animation frame in the animation media file, and at step 550 a morphing effect may be applied to the animation media.

Figure 6A:
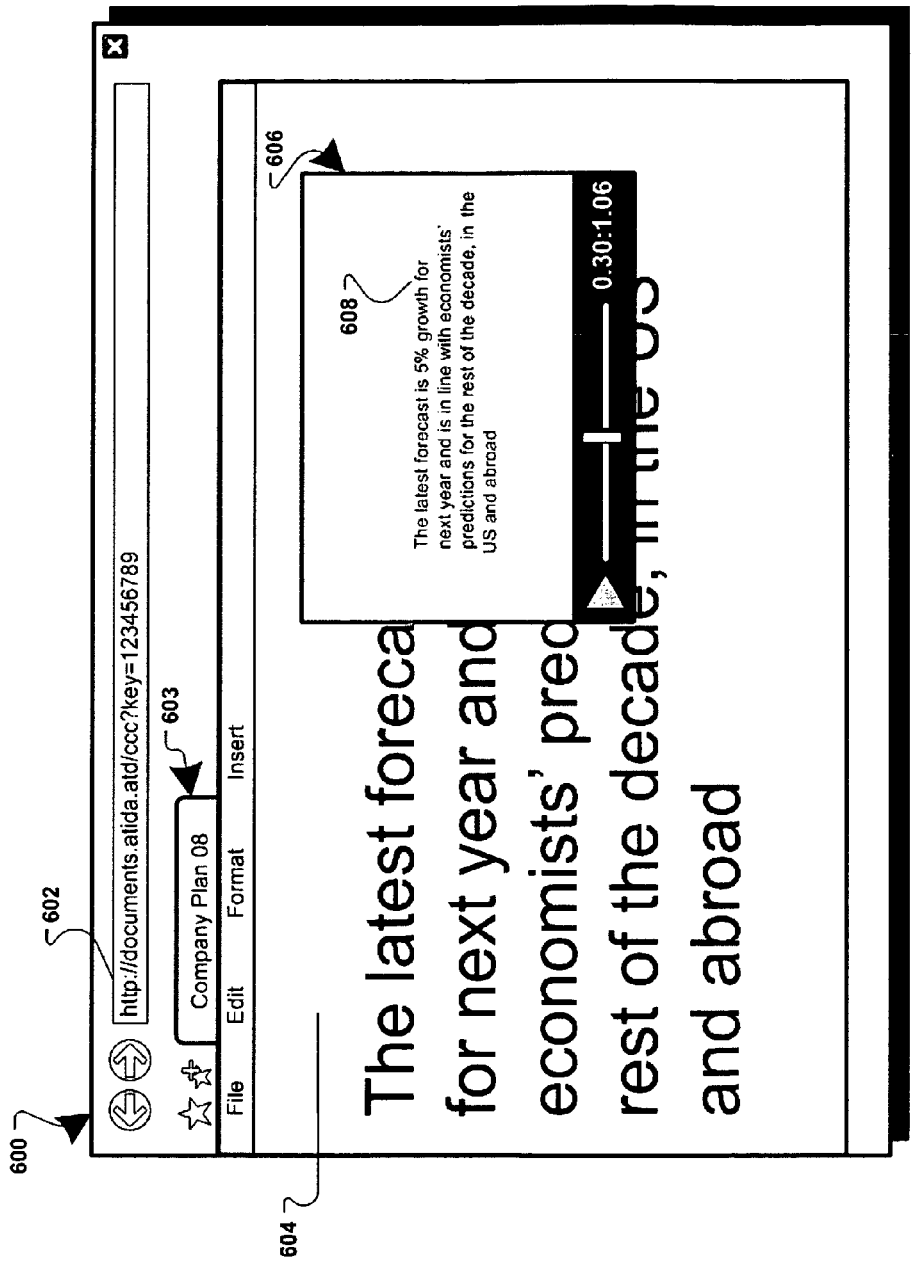
FIGS. 6A and 6B are generalized block diagrams illustrating displaying a revision media file in a web browser ("browser"), according to one embodiment of the present invention.
Figure 6B:
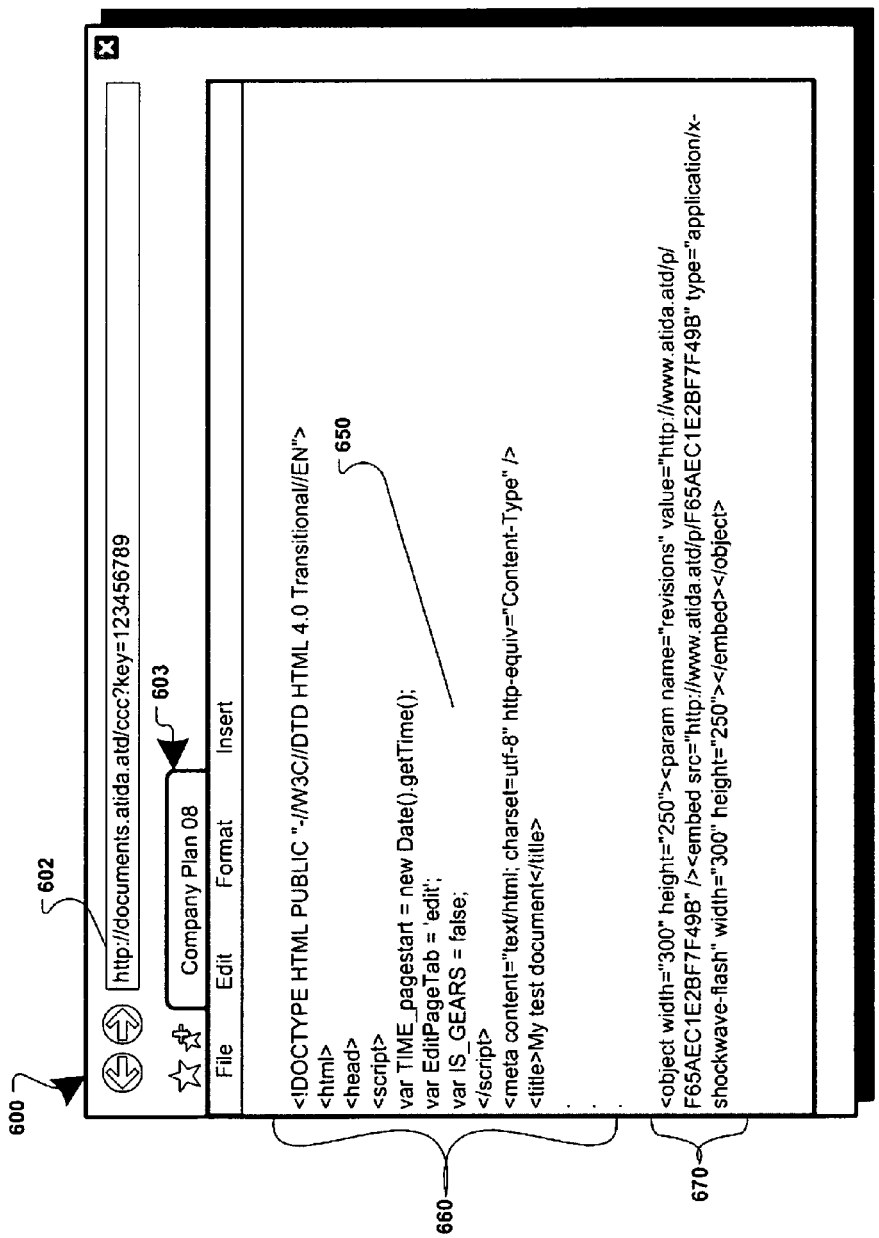

FIGS. 6A and 6B are generalized block diagrams illustrating displaying a revision media file in a web browser ("browser"), according to one embodiment of the present invention. A web browser may be any application on an electronic device, able to display data over a network. More specifically, the data is related to a document supporting one or more revisions of the document.

Referring to FIG. 6A, a browser 600 may display document content 604 in a browser page 603. The document content 604 may be rendered from data that resides in a cloud (i.e. remotely to the client device running the browser 600, and accessible via the browser 600). A plug-in 606 (e.g. a program running on the client electronic device and interacting with the browser 600) may display an animation media 608.

The animation media 608 may contain a visual representation of revisions associated with the document content 604. For example, the plug-in 606 may be an Adobe Shockwave® player and the content (animation media) 608 may be a ".swf" or Shockwave®-supported file.

The plug-in 606 may display user controls allowing the user to control the playback of the animation media 608. The plug-in 606 may be downloaded and installed on the electronic device running the browser 600, in response to a request by the browser 600 to play the animation media 608; or, a pre-installed plug-in 606 may be invoked in response to a request to play the animation media 608.

Referring now also to FIG. 6B, sample document code 650 for displaying the animation media file 608 in the plug-in 606, is illustrated. Code segment 660 illustrate sample HTML code. The sample code segment may be any code, in any one or more computer languages, used in the browser 600 to display the document 604 (please refer to FIG. 6A.)

The sample document code 650 may contain sample plug-in code 670. The sample plug-in code 670 may be used to invoke the plug-in 606, which is used to display the animation media 608. The sample plug-in code 670 may contain information of the type of animation media to be played, the source of the animation media, etc. For example, the sample plug-in code 670 may be:

```
<object width="300" height="250"> <param name="revisions" value="http://www.atida.atd/p/F65AEC1E2BF7F49B" /> <embed src="http://www.atida.atd/p/F65AEC1E2BF7F49B"
```

-continued

```
type="application/x-shockwave-flash"
width ="300" height="250"></embed></object>
```

In this example, the animation media is of type "shockwave-flash" and resides on the Internet at URL "http://www.atida.atd/p/F65AEC1E2BF7F49B".

In alternate embodiments, non-plug-in applications or application extensions, associated with a browser displaying a document, may be used. For example, widgets may be utilized to display animation media. In alternate embodiments using plug-ins, new browser tabs or windows may be automatically created to display animation media files. In other possible embodiments, other means and technologies may be utilized to visually display a timeline depicting changes to a document without deviating from the scope of the present invention.

Figure 7A:
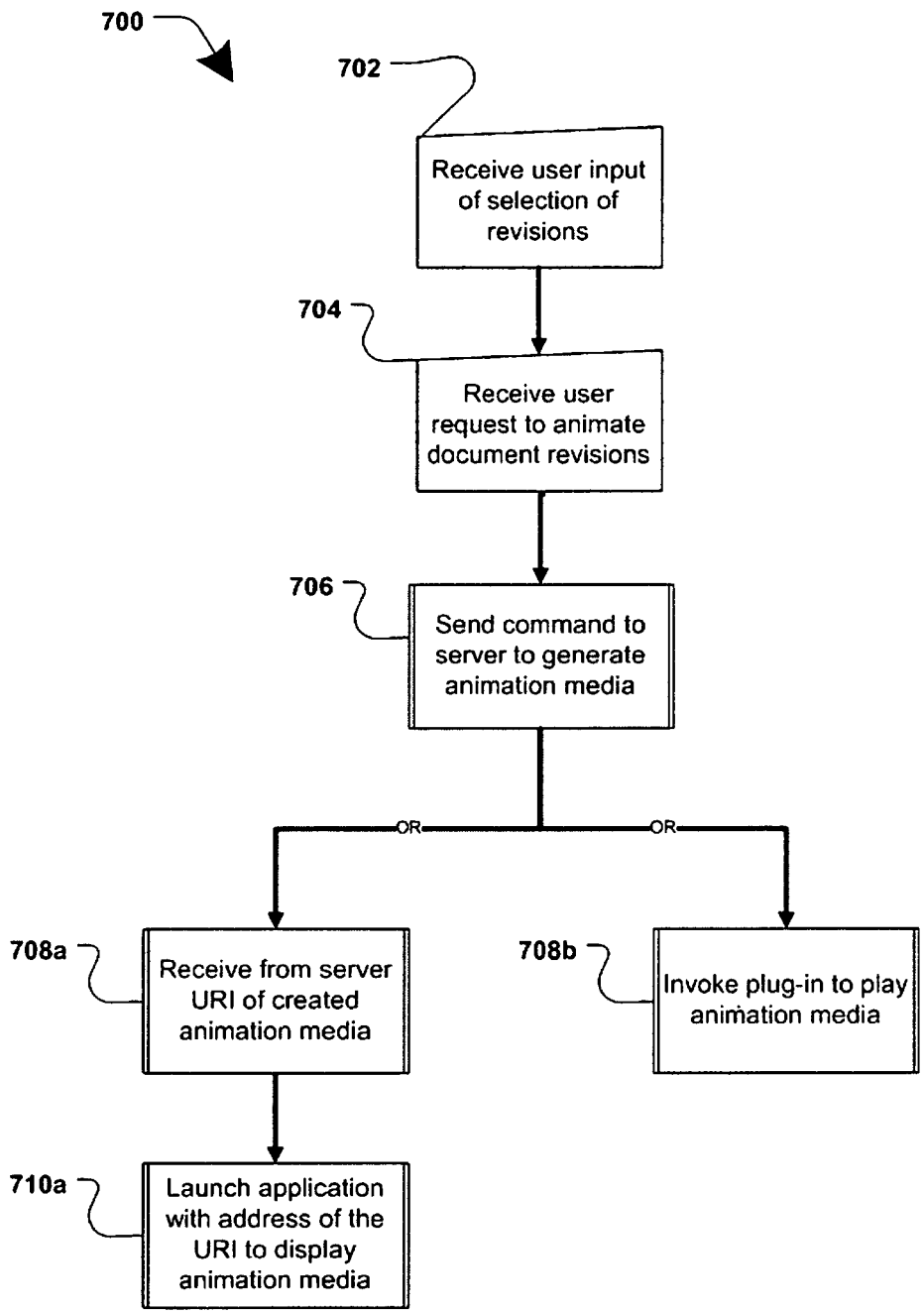
FIGS. 7A and 7B are generalized flow diagrams illustrating a web browsing application's interaction with a remote server hosting a document and a local electronic device, while receiving input from a user, according to various possible embodiments of the present invention.
Figure 7B:
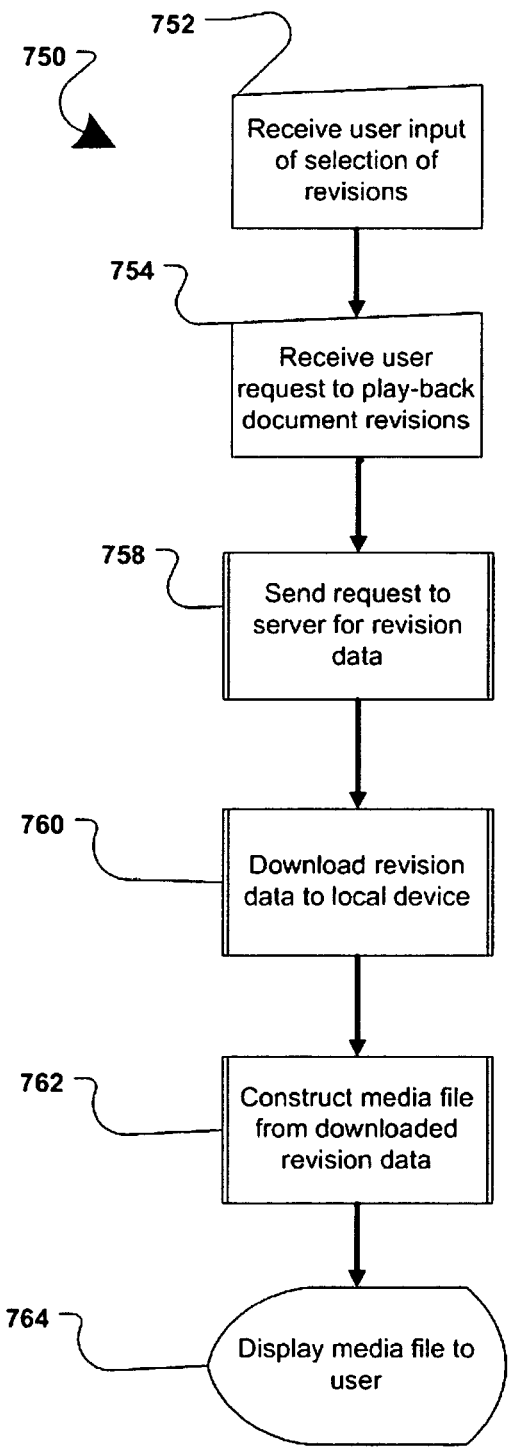

FIGS. 7A and 7B are generalized flow diagrams illustrating a web browsing application's interaction with a remote server hosting a document and a local electronic device, while receiving input from a user, according to various possible embodiments of the present invention. FIG. 7A illustrates a server-side approach, where animation media is created on a server and displayed on the client machine. FIG. 7B illustrates a client-side methodology, where animation media is created on the user's electronic device.

A web browser may be a popular browser such as Internet Explorer®, Apple® Safari™, FireFox™, Google® Chrome™, etc. A web browser may also be a client application on a mobile phone (e.g. iPhone®, Blackberry®, etc.) used to access information online.

In flow chart 700 it is assumed a browser displays a document hosted remotely, which includes revisions to the document, also hosted remotely (e.g. in the "cloud", over a network, on a remote server, on the Internet, etc.) At step 702 the browser receives user input (e.g. keyboard input, mouse click, touch screen or voice command, etc.) selecting one or more document revisions. For example, the user may select multiple revisions associated with the document from a drop-down list or from a context menu. The user input may be received indicating a selection of previous revisions. For example, the browser may display a list of all previous revisions of the document, and the user may select one or more previous revisions to display as animated media.

At step 704, user input may be received to invoke revision animation. For example, the browser may display a control (e.g. as part of content displayed by the browser) to invoke the animation of revisions. A control displayed to the user allowing the user to make the request may be labeled "replay revision history" or "view revision history" or "recreate document timeline", etc.

At step 706, the browser may communicate back to the server an instruction to generate the animation content. For example, using AJAX, XMPP, data-posting, or any other protocol or method, the browser may request from the server to generate the animation media.

In two possible embodiments, illustrated as steps 708a and 710a as one, and 708b as another, the animation content may be retrieved and displayed to the user. In the first embodiment, at step 708a, the browser may receive from the server a URI to the animation file. At step 710a, the browser may then open a new window and/or launch an application and/or navigate to the URI—to display the animation media at the URI. For example, a new browser window may be launched, resized to an ideal size for playback of the content media, and point to the URI to play the content media.

In the second possible embodiment, at step 708*b*, a plug-in (or any other application on the client device) may be invoked to access the URI of the animation media on the server. The plug-in may then play the animation media (e.g. using streaming) on the client device, displaying the animation media to the user.

Referring now to FIG. 7B, flowchart 750 illustrates steps in another embodiment where animation media is created locally on the client device. At step 752, a browsing application on a client device may receive a user's selection of revisions of a document. For example, a browsing application displaying a document may display a list of available revisions of the document, and the user may use various input methods to select any number of the revisions.

At step 754 the user may invoke a command to initiate the animation/play-back of the revisions. For example, the user may select a button in the browsing application called "playback selected revisions". In response to receiving a user's command to create the animation of revisions, at step 758 the browsing application may send a request to a server (e.g. a form GET/POST, AJAX or XMPP-type request, URL request or any other type of request) to retrieve information associated with the selected revisions.

The server may be the server hosting the document; or, a server hosting/having access to the revisions associated with the document, or any other remote computing/storage device containing data on the requested revisions.

At step 760 data associated with the revisions selected may be downloaded by the client device from the server. Various methods, common to network computing, may be be utilized to download the revision data to the client device. The revision data may contain sufficient information (e.g. text, date/times-stamps, graphics and other media) to reconstruct all the selected revisions of the document.

At step 762, an application on the client device may create a media file from the downloaded document revisions. Various animation-creation applications, such as Adobe Flex™, may be used to construct an animation file from re-created revisions of the document. More than one type of application may be utilized in this process, for example, one type of application to recreate each revision in the visual format of a document, another application to take a memory-snap-shot of the revision, and another application to animate the memory-snap-shots into a media file. In the presently-preferred embodiment of the invention, step 762 may take place in a manner invisible to the user (e.g. in the device's memory).

At step 764 the media file may be displayed to the user. For example, an application on the client device (e.g. Windows® Media Player, iTunes®, Adobe® Flash™, etc.) may play the animation media to the user.

Figure 8A:
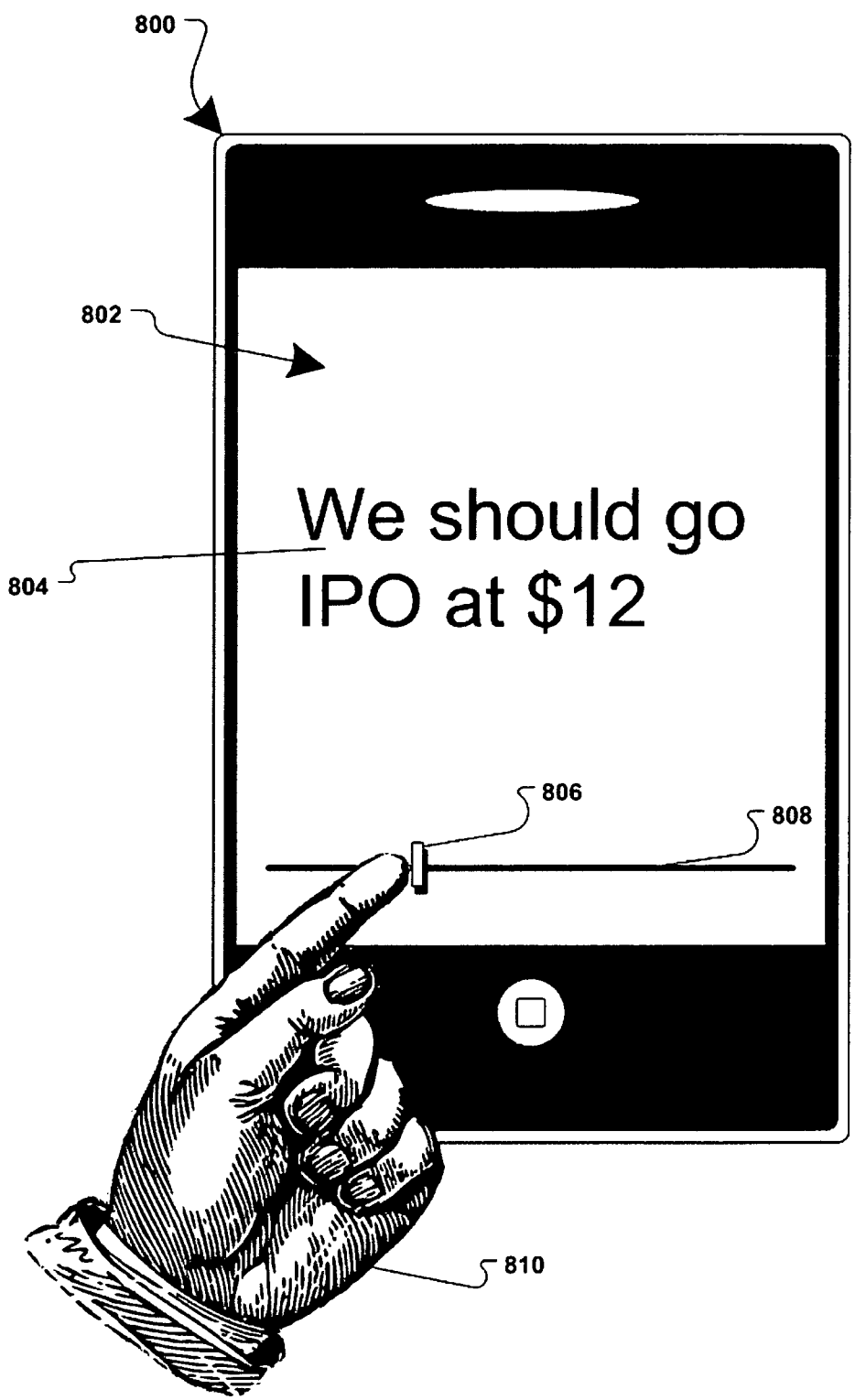
FIGS. 8A-8C are generalized block diagrams illustrating playing-back a sequence of document revisions on a handheld electronic device, according to one possible embodiment of the present invention.
Figure 8B:
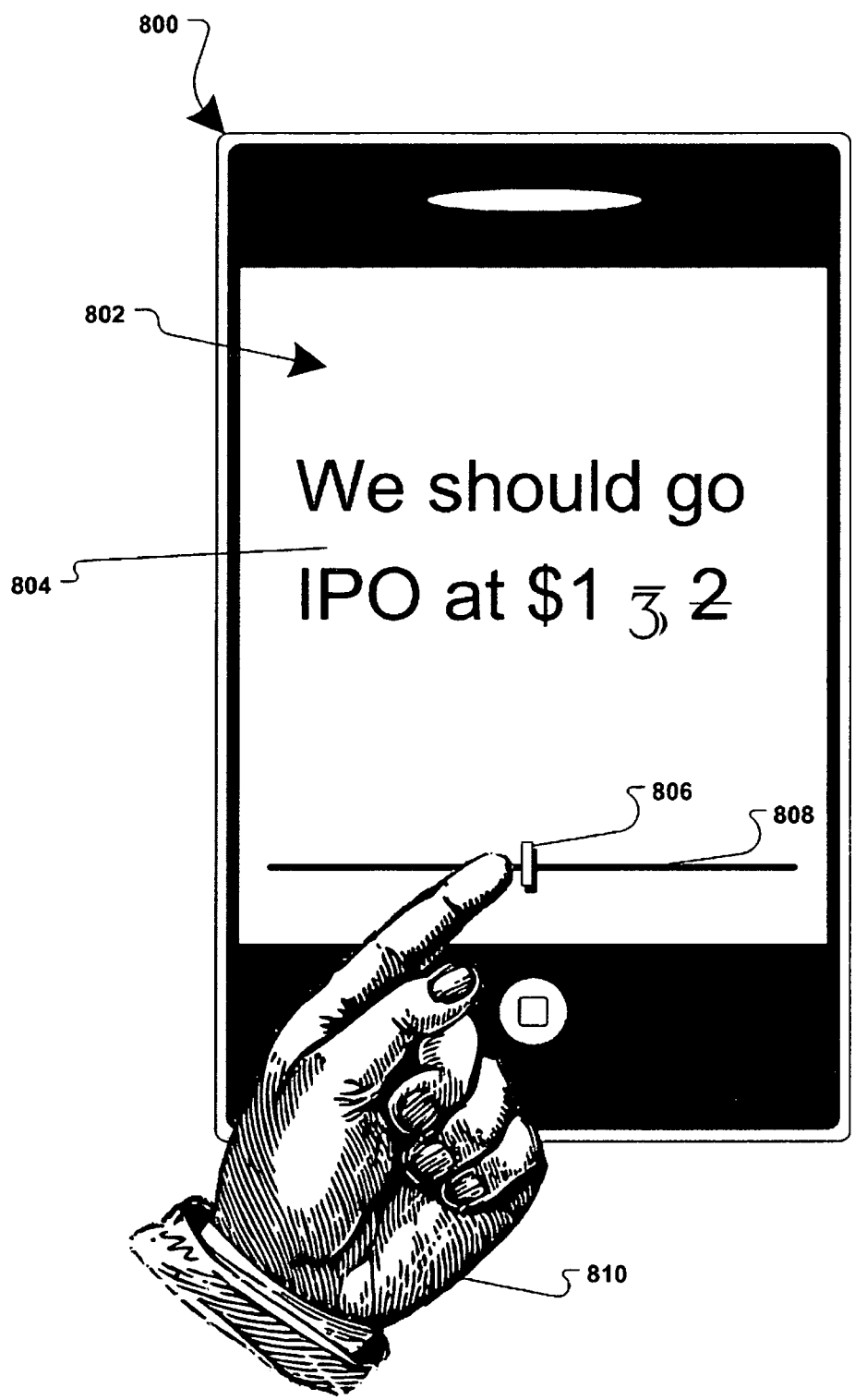

FIGS. 8A and 8B are generalized block diagrams illustrating playing-back a sequence of document revisions on a hand-held electronic device, according to one possible embodiment of the present invention. The hand-held electronic device (e.g. a cell phone, smart phone, iPad® or any other computing device capable of displaying documents and having connectivity to a network) may access a document and its revisions off a remote location (e.g. off the internet) in real-time; or, alternatively, may include a local copy of the document and/or its revisions.

Referring to FIG. 8A, a hand-held electronic device 800 may display a document 802 containing content 804 (please note that the document 802 and its content 804 are for illustrative purposes only—the document is representative of any content editable by a plurality of users, while the content is representative of any sub-portion of the original content content.) A user may use a pointing device 810 to manipulate a control (e.g. slider 806 and 808) in order to replay revision history of the document 802.

Referring also to FIG. 8B, in sliding the scroll bar 806 along slider 808, in this example to the right which may represent traversing revision history from-older-to-newer, the content 804 may change to read "We should go IPO at $13", with the "3" character and the "2" character in a morphing transition (i.e. with the "2" gradually fading out and the "3" gradually becoming solid). In this example, an earlier revision of the document contained text "$12" while a newer revision replaced that text with "$13"—hence the morphing transition.

Figure 8C:
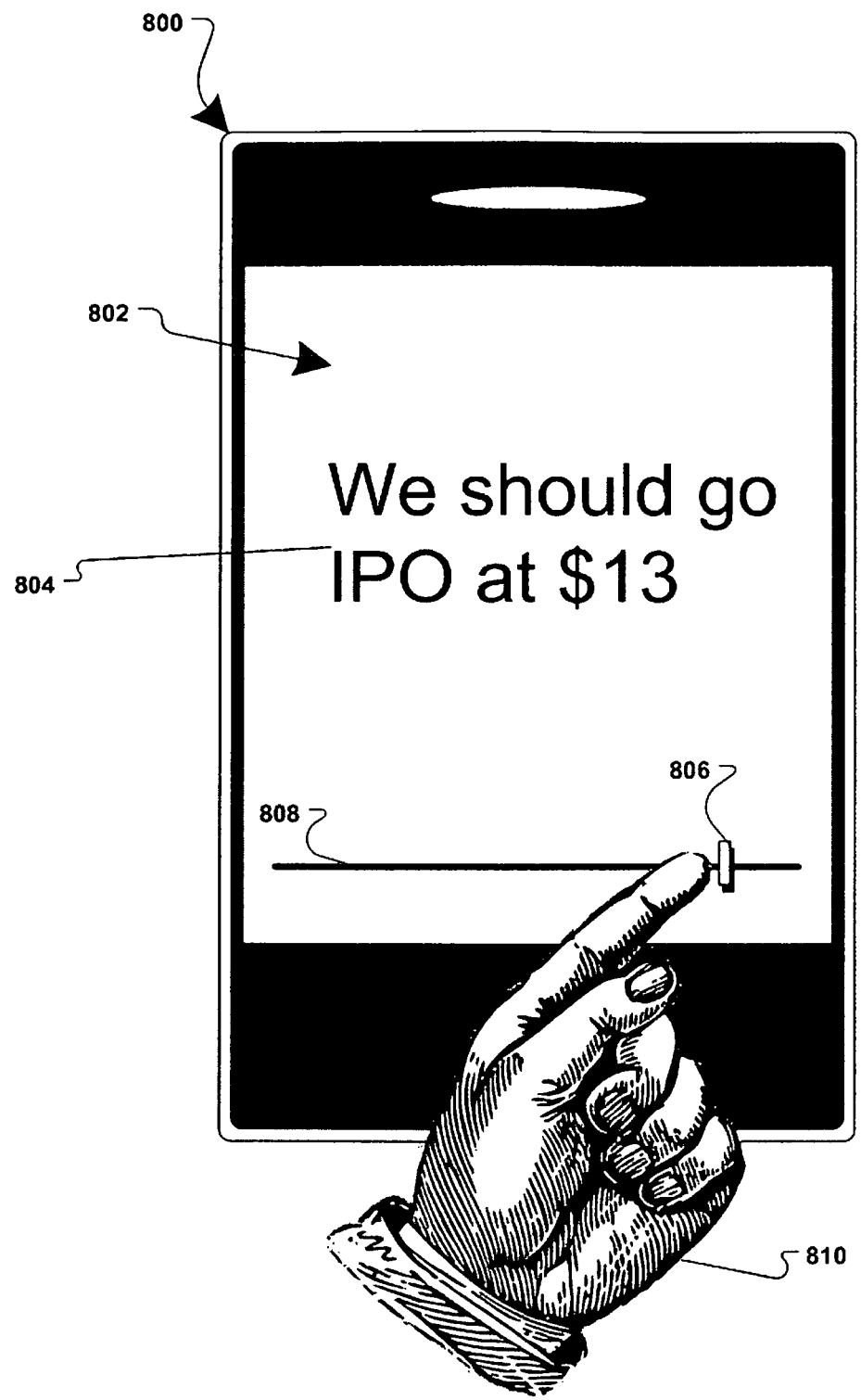

Referring now additionally to FIG. 8C, further sliding of the scroll bar 806 to the right (i.e. forward in time) may display later revisions of the document 802. For example, the text 804 in FIG. 8B—which appears in a partially-morphed state (i.e. the character "3" is not solid and the character "2" is still visible) may now be displayed in its complete state in FIG. 8C: the "3" character is solid and the "2" character is no longer displayed. Likewise, traversing the FIGS. 8A, B & C in reverse order, whereby the scroll bar 806 is slid from right-to-left, may cause the document 802 to morph from its newer revision in FIG. 8C to its older revision in FIG. 8B, through the morphing transition stage depicted in FIG. 8B.

Figure 9:
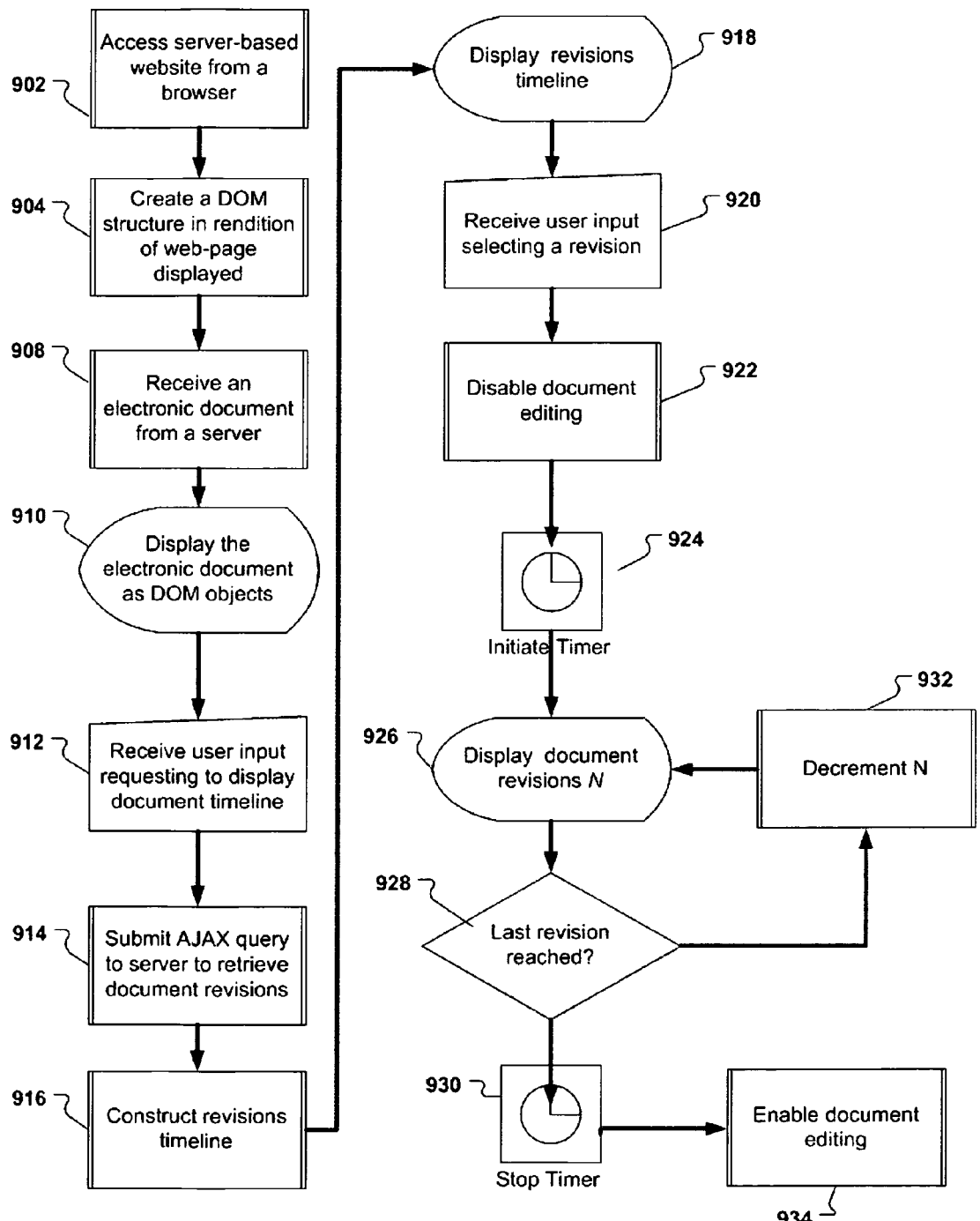
FIG. 9 is a generalized flow diagram illustrating retrieving and displaying a document, and consequently retrieving and displaying revisions associated with the document, to create a "document evolution" effect, in various preferred embodiments of the present invention.

FIG. 9 is a generalized flow diagram illustrating retrieving and displaying a document, and consequently retrieving and displaying revisions associated with the document, to create a "document evolution" effect, in various preferred embodiments of the present invention.

At step 902, a website may be accessed by a web browser associated with an electronic device. The website may be a web service offering document editing; or, any website on the Internet/an intranet capable of rendering a website from which documents may be displayed.

At step 904, DOM (Document Object Model) may be used by the web browser as part of the process of rendering a web page displayed by the website. DOM encompasses web-presentation technology/API that are standard across all modern web browsers. The DOM model allows for individual elements within the web page, for example a word-processing-document being displayed, or a "see history" button, to be accessed programmatically and to generate events which may be used by the web browser to invoke actions.

At step 908, an electronic document may be retrieved by code in the website, processed by the web browser. Document retrieval is well known in the prior art, and may be accomplished in many ways. Similarly, at step 910, the electronic document (e.g. a MS Word®-compatible document) may be displayed as part of the DOM in the web browser.

At step 912, user input may be received requesting viewing of revision history of the current electronic document. In various embodiments, the user may choose a command from a menu (e.g. "display document revisions"), or alternatively may issue a keyboard command, voice command, etc.

In response to the user request, at step 914, an AJAX query may be constructed and sent by code (e.g. Javascript) included in the website, but running in the web browser, requesting the server (or any other data store storing document revisions) to transmit back to the web browser revision information related to the current electronic document. Information may be packaged, transmitted and received in XML packets; or, alternatively, in any other data structure.

In one possible embodiment, the entire revision history of the current document—i.e. entire saved versions of the electronic document—may be retrieved. In alternate embodiments, less data pertaining to the revisions may be transmitted. In one example, only headers (e.g. revision author name, revision date/time) may be transmitted at first; then, after the user has made further selections of specific revisions, only a new set of revisions meeting the newly selected criteria, may be transmitted. One clear advantage of the latter embodiment is saving on bandwidth, especially when the user is on a slower connection (e.g. mobile 3G link) and/or the document revisions are very large (e.g. AutoCAD® drawings).

At step 916, a revisions timeline may be constructed from the revisions retrieved at step 914, and at step 918, the revision timeline may be displayed. The revision timeline may be displayed in chronological order, i.e. earliest revision on the left, latest on the right, and the rest in between. Various information related to the revisions may be displayed along with the timeline, e.g. author name, date of revision, etc. In one presently preferred embodiment, the timeline may be an actionable control, i.e. the user may be able to click on portions of it to select specific revisions. In alternate embodiments, the timeline may be a list of saved versions in a context/popup menu, etc.

At step 920, user input may be received selecting one or more of the revisions. As discussed earlier, the revisions may be displayed in various ways, and consequently, the user may use various means, from clicking checkboxes associated with revisions, to issuing voice commands, to select the revisions.

At step 922, document editing may be temporarily disabled. Since steps 924-932 change the display of the document, as discussed below, it may be advantageous, in the presently-preferred embodiment, to temporarily halt user edit commands, in order to avoid "malformed" versions of the document from being prematurely edited.

At step 924, a system timer may be initiated in order to control visual presentation of all the traversed revisions of the electronic document. For example, if the user has chosen to view evolution of the present document going back five revisions, the system timer at step 924 may be set to roll back each version once every 10 seconds. The use of a system timer is not critical for all embodiments of the present invention, but may present certain advantages, especially in terms of viewability.

At step 926, a specific document revision "N" may be displayed. In one possible embodiment, the revision N may be re-created and presented in its final form. In an alternate possible embodiment, the document revision N may be achieved by automatically re-issuing user-edit commands that had been used originally to create the revision N. For example. if revision N represents the word "am" inserted after the word "I" and before the word "here", the electronic document may be transmitted internal commands mimicking a user's typing the word "am" in the right place, including the correct text treatment for a specific user's edit (e.g. edits by user Nancy are underlined in red).

At step 928, it may be determined whether the last revision, for the user's selected revisions to display, has been reached. If the last revision selected has not been reached, at step 932 N may be decremented, and step 926 may be repeated, causing the presently-previous revision N−1 to be displayed. For example, if the user had selected to view last five revisions, and revision four has been displayed, at step 928 it may be determined that the last revision has not yet been displayed, causing step 932 to decrement (or increment, the vector is arbitrary in this example, as revisions may be displayed morphing forward or backwards) and the next revision to be displayed at step 926.

If it is determined at step 928 that the last requested revision has been displayed, at step 930 the system timer may be stopped, and at step 934, document editing may be re-enabled.

The invention has been described with reference to particular embodiments. However, it will be readily apparent to those skilled in the art that it is possible to embody the invention in specific forms other than those of the preferred embodiments described above. This may be done without departing from the spirit of the invention.

What is claimed is:

1. A method of retrieving and displaying a traversable, chronological representation of an electronic document's evolution in a web-browsing application, comprising:
    displaying an electronic document in a first state within a web-browsing application;
    receiving a user instruction to view evolutionary changes to the electronic document;
    transmitting an Asynchronous JavaScript and XML ("AJAX") request to a server to retrieve stored versions of the electronic document;
    receiving via AJAX from the server the stored versions of the electronic document;
    constructing a timeline, wherein the timeline is representative of the stored versions of the electronic document;
    displaying the timeline;
    receiving user selection of at least one point on the timeline wherein the at least one point on the timeline represents the electronic document in a second state; and
    morphing the electronic document from the first state to the second state, wherein the morphing is displayed as animation, further including:
    creating one or more transient representations of the electronic document, each transient representation containing a visual combination of the electronic document at its first state, at one transparency factor, combined with the second state of the electronic document at its second state at a second transparency factor, and displaying the one or more transient representations at a human-eye perceptible transition speed, prior to displaying the second state of the document.

2. The method of claim 1, wherein the step of transmitting an AJAX request further includes transmitting an XML representation of the one state of the electronic document.

3. The method of claim 1, wherein the step of transmitting an AJAX request is performed by Javascript code running within the web-browsing application.

4. The method of claim 1, wherein the morphing of the electronic document further includes:
    disabling editing of the electronic document;
    displaying a visual effect of the electronic document changing from the first state to the second state;
    enabling editing of the electronic document.

5. The method of claim 4, wherein the step of displaying the visual effect of the electronic document changing from the first state to the second state, further includes applying a morphing algorithm to the combination of the first and the second states of the electronic document.

6. The method of claim 4, wherein the step of displaying the visual effect of the electronic document changing from the first state to the second state, further includes:
    discerning from the second state a user action required to re-create the second state; and
    applying the user action to the first state of the electronic document.

7. The method of claim 4, further including:
discerning at least one portion of the electronic document affected by the visual effect; and
automatically scrolling the electronic document to make the at least one portion visible to the user.

8. The method of claim 4, wherein changes to the electronic document affected by the visual effect are represented by a different text treatment.

9. The method of claim 8, wherein the different text treatment is consistent with text treatment of user edits, wherein the user edits are of the type represented by the second state of the document.

10. The method of claim 1, wherein the steps of transmitting the AJAX request, receiving the stored versions of the electronic document, displaying the timeline and receiving the user selection of the at least one point on the timeline, further include:
transmitting a first AJAX request to the server to retrieve header data representing the stored revisions of the electronic document, the header data including at least a timestamp and an author for each one of the stored revisions;
constructing the timeline, wherein the timeline includes the header data;
receiving user input selecting the at least one point on the timeline; and
transmitting a second AJAX request to the server to retrieve the revision corresponding with the at least one point on the timeline.

11. The method of claim 1, wherein the timeline is graphical control and wherein the graphical control is a Document Object Model ("DOM") element.

12. The method of claim 11, wherein events invoked by the graphical control trigger AJAX communication between the web-browsing application and the server.

13. A computer-implemented method of displaying evolution of an electronic document, comprising:
presenting a Document Object Model ("DOM") within a web-browsing application;
presenting an electronic document within the DOM;
transmitting an Asynchronous JavaScript and XML ("AJAX") request to a remote device;
receiving from the remote device revision history of the electronic document, wherein the revision history is received via AJAX;
choosing a first and a second reference points from the revision history;
determining revision points between the first and the second reference points;
traversing the determined revision points and generating a plurality of graphical representations of the electronic document at each of the revision points wherein each of the graphical representations includes a graphical combination of the electronic document at the first reference point, displayed a first transparency factor, combined with a graphical representation of the electronic document at the second reference point, displayed at a second transparency factor;
constructing a presentation sequence comprised of the plurality of graphical representations; and
displaying the presentation sequence as animation-sequence-playback, wherein the animation-sequence-playback terminates upon displaying the electronic document at the second reference point.

14. The method of claim 13, further comprising the steps of:
at each of the determined revision points, further determining a region of the electronic document most affected by changes; and
displaying a portion of the presentation sequence corresponding with the determined region of the electronic document most affected by the changes.

15. The method of claim 13, wherein the step of constructing the presentation sequence further includes morphing the graphical representation of the document at each of the revision points with a previous graphical representation of the document at an earlier revision point.

16. The method of claim 13, further comprising:
allowing a user to affect one or more of the following parameters of the animation-sequence-playback: playing animation forward, playing animation backward, playing animation faster, playing animation slower, stopping the animation playback.

17. The method of claim 13, further comprising disallowing the user to edit the electronic document during the playback of the presentation sequence.

18. The method of claim 13, further comprising the steps of:
receiving user input requesting to stop the animation-sequence-playback;
determining from the revision points one revision point corresponding most closely to the point in time when the user input was received;
stopping the animation sequence playback;
presenting the document at the one revision point; and
allowing the user to edit the electronic document.

19. The method of claim 13, further comprising the steps of:
receiving user input indicating scrolling;
scrolling the electronic document in response to the user input, wherein a new portion of the electronic document is displayed;
determining a portion of the presentation sequence corresponding with the new displayed portion of the electronic document; and
displaying the determined portion of the presentation sequence.

20. The method of claim 13, wherein the step of displaying the presentation sequence further includes:
initiating a system timer; and,
displaying the traversed revisions of the electronic document at intervals corresponding with timed intervals of the system timer.

* * * * *